(12) United States Patent
Yu et al.

(10) Patent No.: US 10,171,828 B2
(45) Date of Patent: Jan. 1, 2019

(54) MODIFICATION OF UNIFICATION OF INTRA BLOCK COPY AND INTER SIGNALING RELATED SYNTAX AND SEMANTICS

(71) Applicant: ARRIS Enterprises, Inc., Suwanee, GA (US)

(72) Inventors: Yue Yu, San Diego, CA (US); Limin Wang, San Diego, CA (US); Zhouye Gu, San Diego, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 289 days.

(21) Appl. No.: 15/055,870

(22) Filed: Feb. 29, 2016

(65) Prior Publication Data

US 2016/0255359 A1 Sep. 1, 2016

Related U.S. Application Data

(60) Provisional application No. 62/121,595, filed on Feb. 27, 2015.

(51) Int. Cl.
*H04N 19/46* (2014.01)
*H04N 19/105* (2014.01)
(Continued)

(52) U.S. Cl.
CPC ........... *H04N 19/46* (2014.11); *H04N 19/105* (2014.11); *H04N 19/107* (2014.11); *H04N 19/159* (2014.11); *H04N 19/172* (2014.11); *H04N 19/176* (2014.11); *H04N 19/52* (2014.11); *H04N 19/527* (2014.11); *H04N 19/577* (2014.11); *H04N 19/593* (2014.11); *H04N 19/70* (2014.11); *H04N 19/91* (2014.11)

(58) Field of Classification Search
CPC .............................. H04N 19/91; H04N 19/176
See application file for complete search history.

(56) References Cited

U.S. PATENT DOCUMENTS

| 2010/0067574 A1* | 3/2010 | Knicker | G06T 5/002 375/240.12 |
|---|---|---|---|
| 2013/0202034 A1* | 8/2013 | Yu | H04N 19/50 375/240.12 |

(Continued)

OTHER PUBLICATIONS

PCT Search Report & Written Opinion, RE: Application No. PCT/US2016/020035, dated May 20, 2016.
C. Pang, et al., "Non-CE2: Intra block copy and inter signalling unification", 20th JCT-VC Meeting (Joint Collaborative Team on Video Coding of ISO/IEC JTC1/SC29/WG11 and ITU-T SG.16), Feb. 15, 2015, 3 pgs.

(Continued)

*Primary Examiner* — William C Vaughn, Jr.
*Assistant Examiner* — Jerry T Jean Baptiste
(74) *Attorney, Agent, or Firm* — Thomas A. Ward

(57) ABSTRACT

A method and apparatus for processing picture slices is disclosed. The method determines if the slice of the current picture excludes any predictive coding derived from another picture. If the slice of the current picture is designated to exclude any predictive coding derived from another picture, a flag is set to a first logic state, and if the slice of the current picture is not designated to exclude any predictive coding derived from another picture, the flag is set to a second logic state. Further, at least a portion of predicted weight processing of the slice of the current picture is bypassed according to the logic state of the flag.

5 Claims, 25 Drawing Sheets

(51) Int. Cl.

| | |
|---|---|
| *H04N 19/172* | (2014.01) |
| *H04N 19/176* | (2014.01) |
| *H04N 19/52* | (2014.01) |
| *H04N 19/527* | (2014.01) |
| *H04N 19/577* | (2014.01) |
| *H04N 19/593* | (2014.01) |
| *H04N 19/91* | (2014.01) |
| *H04N 19/159* | (2014.01) |
| *H04N 19/70* | (2014.01) |
| *H04N 19/107* | (2014.01) |

(56) References Cited

U.S. PATENT DOCUMENTS

2015/0063440 A1* 3/2015 Pang .................... H04N 19/174
 375/240.02
2016/0255373 A1* 9/2016 Deshpande ............ H04N 19/70
 375/240.25

OTHER PUBLICATIONS

C. Pang, et al., "CE2 Test1: Intra block copy and intersignalling unification", 20th JCT-VC Meeting (Joint Collaborative Team on Video Coding of ISO/IEC JTC1/SC29/WG11 and ITU-T SG.16), Jan. 13, 2015, 4 pgs.

C. Pang, et al., "Non-CE2: Intra block copy and Inter signaling unification", 19th JCT-VC Meeting (Joint Collaborative Team on Video Coding of ISO/IEC JTC1/SC29/WG11 and ITU-T SG.16), Oct. 22, 2014, 6 pgs.

C. Pang, et al., "Non-CE2: Intra block copy with Inter signaling", 19th JCT-VC Meeting (Joint Collaborative Team on Video Coding of ISO/IEC JTC1/SC29/WG11 and ITU-T SG.16), Oct. 21, 2014, 4 pgs.

G. Sullivan, et al., "Meeting Report of 18th JCT-VC Meeting", 18th JCT-VC Meeting (Joint Collaborative Team on Video Coding of ISO/IEC JTC1/SC29/WG11 and ITU-T SG.16), Oct. 17, 2014, 200 pgs.

* cited by examiner

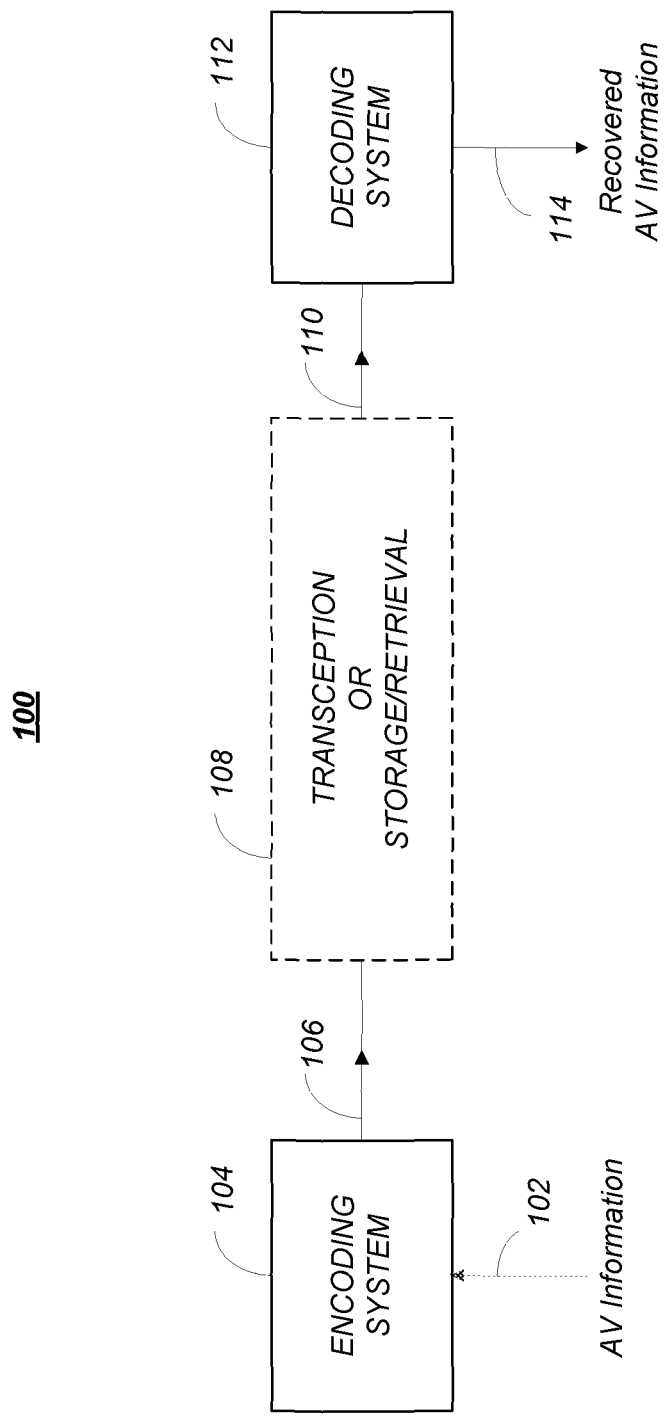

P = List 0

| idx | R pix |
|---|---|
| 0 | 4 |
| 1 | 2 |
| 2 | 0 |
| 3 | 6 |
| 4 | 8 |
| 5 | 10 |

P, B = List 1

| idx | R pix |
|---|---|
| 0 | 6 |
| 1 | 8 |
| 2 | 10 |
| 3 | 4 |
| 4 | 2 |
| 5 | 0 |

| pic_parameter_set_rbsp( ) { | Descriptor |
|---|---|
| pic_parameter_set_id | ue(v) |
| seq_parameter_set_id | ue(v) |
| sign_data_hiding_flag | u(1) |
| cabac_init_present_flag | u(1) |
| num_ref_idx_l0_default_active_minus1 | ue(v) |
| num_ref_idx_l1_default_active_minus1 | ue(v) |
| pic_init_qp_minus26 | se(v) |
| constrained_intra_pred_flag | u(1) |
| transform_skip_enabled_flag | u(1) |
| cu_qp_delta_enabled_flag | u(1) |
| if( cu_qp_delta_enabled_flag ) | |
|    diff_cu_qp_delta_depth | ue(v) |
| pic_cb_qp_offset | se(v) |
| pic_cr_qp_offset | se(v) |
| pic_slice_level_chroma_qp_offsets_present_flag | u(1) |
| weighted_pred_flag | u(1) |
| weighted_bipred_flag | u(1) |
| output_flag_present_flag | u(1) |
| transquant_bypass_enable_flag | u(1) |
| dependent_slice_enabled_flag | u(1) |
| tiles_enabled_flag | u(1) |
| entropy_coding_sync_enabled_flag | u(1) |
| entropy_slice_enabled_flag | u(1) |
| if( tiles_enabled_flag ) { | |
|    num_tile_columns_minus1 | ue(v) |
|    num_tile_rows_minus1 | ue(v) |
|    uniform_spacing_flag | u(1) |
|    if( !uniform_spacing_flag ) { | |
|      for( i = 0; i < num_tile_columns_minus1; i++ ) | |
|        column_width_minus1[ i ] | ue(v) |
|      for( i = 0; i < num_tile_rows_minus1; i++ ) | |
|        row_height_minus1[ i ] | ue(v) |
|    } | |
|    loop_filter_across_tiles_enabled_flag | u(1) |
| } | |

1602 → weighted_pred_flag
1604 → weighted_bipred_flag

| slice_segment_header() { | Descriptor |
|---|---|
|   first_slice_segment_in_pic_flag | u(1) |
|   if( nal_unit_type >= BLA_W_LP && nal_unit_type <= RSV_IRAP_VCL23 ) | |
|     no_output_of_prior_pics_flag | u(1) |
|   slice_pic_parameter_set_id | ue(v) |
|   if( !first_slice_segment_in_pic_flag ) { | |
|     if( dependent_slice_segments_enabled_flag ) | |
|       dependent_slice_segment_flag | u(1) |
|     slice_segment_address | u(v) |
|   } | |
|   if( !dependent_slice_segment_flag ) { | |
|     for( i = 0; i < num_extra_slice_header_bits; i++ ) | |
|       slice_reserved_flag[ i ] | u(1) |
|     slice_type | ue(v) |
|     if( output_flag_present_flag ) | |
|       pic_output_flag | u(1) |
|     if( separate_colour_plane_flag == 1 ) | |
|       colour_plane_id | u(2) |
|     if( nal_unit_type != IDR_W_RADL && nal_unit_type != IDR_N_LP ) { | |
|       slice_pic_order_cnt_lsb | u(v) |
|       short_term_ref_pic_set_sps_flag | u(1) |
|       if( !short_term_ref_pic_set_sps_flag ) | |
|         st_ref_pic_set( num_short_term_ref_pic_sets ) | |
|       else if( num_short_term_ref_pic_sets > 1 ) | |
|         short_term_ref_pic_set_idx | u(v) |
|       if( long_term_ref_pics_present_flag ) { | |
|         if( num_long_term_ref_pics_sps > 0 ) | |
|           num_long_term_sps | ue(v) |
|         num_long_term_pics | ue(v) |
|         for( i = 0; i < num_long_term_sps + num_long_term_pics; i++ ) { | |
|           if( i < num_long_term_sps ) { | |
|             if( num_long_term_ref_pics_sps > 1 ) | |
|               lt_idx_sps[ i ] | u(v) |
|           } else { | |
|             poc_lsb_lt[ i ] | u(v) |
|             used_by_curr_pic_lt_flag[ i ] | u(1) |
|           } | |
|           delta_poc_msb_present_flag[ i ] | u(1) |
|           if( delta_poc_msb_present_flag[ i ] ) | |
|             delta_poc_msb_cycle_lt[ i ] | ue(v) |
|         } | |
|       } | |

*FIG. 17A*

| | | |
|---|---|---|
| 1715 | if( slice_type == P \|\| slice_type == B ) { | |
| 1717 |   num_ref_idx_active_override_flag | u(1) |
| 1718 |   if( num_ref_idx_active_override_flag ) { | |
| |     num_ref_idx_l0_active_minus1 | ue(v) |
| |     if( slice_type == B ) | |
| |       num_ref_idx_l1_active_minus1 | ue(v) |
| |   } | |
| 1719 |   if( lists_modification_present_flag && NumPicTotalCurr > 1 ) | |
| |     ref_pic_lists_modification( ) | |
| 1720 |   if( slice_type == B ) | |
| |     mvd_l1_zero_flag | u(1) |
| 1722 |   if( cabac_init_present_flag ) | |
| |     cabac_init_flag | u(1) |
| 1724 |   if( slice_temporal_mvp_enabled_flag ) { | |
| 1730 |     if( slice_type == B ) | |
| 1732 |       collocated_from_l0_flag | u(1) |
| 1734 |     if( ( collocated_from_l0_flag && num_ref_idx_l0_active_minus1 > 0 ) \|\|<br>      ( !collocated_from_l0_flag && num_ref_idx_l1_active_minus1 > 0 ) ) | |
| |       collocated_ref_idx | ue(v) |
| |   } | |
| 1736 |   if( ( weighted_pred_flag && slice_type == P ) \|\|<br>    ( weighted_bipred_flag && slice_type == B ) ) | |
| |     pred_weight_table( ) | |
| 1738 |   five_minus_max_num_merge_cand | ue(v) |
| 1739 |   if( motion_vector_resolution_control_idc == 2 ) | |
| |     use_integer_mv_flag | u(1) |
| | } | |
| 1740 | slice_qp_delta | se(v) |
| | if( pps_slice_chroma_qp_offsets_present_flag ) { | |
| |   slice_cb_qp_offset | se(v) |
| |   slice_cr_qp_offset | se(v) |
| | } | |

*FIG. 17B*

| | | |
|---|---|---|
| | if( chroma_qp_offset_list_enabled_flag ) | |
| | cu_chroma_qp_offset_enabled_flag | u(1) |
| | if( deblocking_filter_override_enabled_flag ) | |
| 1742 | deblocking_filter_override_flag | u(1) |
| | if( deblocking_filter_override_flag ) { | |
| | slice_deblocking_filter_disabled_flag | u(1) |
| | if( !slice_deblocking_filter_disabled_flag ) { | |
| | slice_beta_offset_div2 | se(v) |
| | slice_tc_offset_div2 | se(v) |
| | } | |
| | } | |
| | } | |
| 1743 | if( pps_loop_filter_across_slices_enabled_flag && <br> ( slice_sao_luma_flag \|\| slice_sao_chroma_flag \|\| <br> !slice_deblocking_filter_disabled_flag ) ) | |
| | slice_loop_filter_across_slices_enabled_flag | u(1) |
| | } | |
| | if( tiles_enabled_flag \|\| entropy_coding_sync_enabled_flag ) { | |
| | num_entry_point_offsets | ue(v) |
| | if( num_entry_point_offsets > 0 ) { | |
| | offset_len_minus1 | ue(v) |
| | for( i = 0; i < num_entry_point_offsets; i++ ) | |
| | entry_point_offset_minus1[ i ] | u(v) |
| 1744 | } | |
| | } | |
| | if( slice_segment_header_extension_present_flag ) { | |
| | slice_segment_header_extension_length | ue(v) |
| | for( i = 0; i < slice_segment_header_extension_length; i++ ) | |
| | slice_segment_header_extension_data_byte[ i ] | u(8) |
| | } | |
| | byte_alignment( ) | |
| | } | |

FIG. 17C

| | | |
|---|---|---|
| 2202 — | if( slice_type == P || slice_type == B ) && !InSCCIRAP) { | |
| 1717 — |   num_ref_idx_active_override_flag | u(1) |
| 1718 { |   if( num_ref_idx_active_override_flag ) { | |
| |     num_ref_idx_l0_active_minus1 | ue(v) |
| |     if( slice_type == B ) | |
| |       num_ref_idx_l1_active_minus1 | ue(v) |
| |   } | |
| 1719 { |   if( lists_modification_present_flag && NumPicTotalCurr > 1 ) | |
| |     ref_pic_lists_modification( ) | |
| 1720 { |   if( slice_type == B ) | |
| |     mvd_l1_zero_flag | u(1) |
| 1722 { |   if( cabac_init_present_flag ) | |
| |     cabac_init_flag | u(1) |
| 1724 { |   if( slice_temporal_mvp_enabled_flag ) { | |
| 1730 — |     if( slice_type == B ) | |
| 1732 — |       collocated_from_l0_flag | u(1) |
| 1734 { |     if( ( collocated_from_l0_flag && num_ref_idx_l0_active_minus1 > 0 ) || <br>      ( !collocated_from_l0_flag && num_ref_idx_l1_active_minus1 > 0 ) ) | |
| |       collocated_ref_idx | ue(v) |
| |   } | |
| 1736 { |   if( ( weighted_pred_flag && slice_type == P && ) || <br>    ( weighted_bipred_flag && slice_type == B ) ) | |
| |     pred_weight_table( ) | |
| 1738 — |   five_minus_max_num_merge_cand | ue(v) |
| 1739 { |   if( adaptive_mv_resolution_enabled_flag ) | |
| |     use_integer_mv_flag | u(1) |
| |   } | |
| 1740 { |   slice_qp_delta | se(v) |
| |   if( pps_slice_chroma_qp_offsets_present_flag ) { | |
| |     slice_cb_qp_offset | se(v) |
| |     slice_cr_qp_offset | se(v) |

| | | |
|---|---|---|
| 1715 | if( slice_type == P || slice_type == B ) { | |
| 1717 |   num_ref_idx_active_override_flag | u(1) |
| 1718 |   if( num_ref_idx_active_override_flag ) { | |
| |     num_ref_idx_l0_active_minus1 | ue(v) |
| |     if( slice_type == B ) | |
| |       num_ref_idx_l1_active_minus1 | ue(v) |
| |   } | |
| 1719 |   if( lists_modification_present_flag && NumPicTotalCurr > 1 ) | |
| |     ref_pic_lists_modification( ) | |
| 2402 |   if( !IsSCCIRAP ) { | |
| 1720 |     if( slice_type == B ) | |
| |       mvd_l1_zero_flag | u(1) |
| 1722 |     if( cabac_init_present_flag ) | |
| |       cabac_init_flag | u(1) |
| 1724 |     if( slice_temporal_mvp_enabled_flag ) { | |
| 1730 |       if( slice_type == B ) | |
| 1732 |         collocated_from_l0_flag | u(1) |
| 1734 |       if( ( collocated_from_l0_flag && num_ref_idx_l0_active_minus1 > 0 ) \|\| <br>         ( !collocated_from_l0_flag && num_ref_idx_l1_active_minus1 > 0 ) ) | |
| |         collocated_ref_idx | ue(v) |
| |     } | |
| 1736 |     if( ( weighted_pred_flag && slice_type == P ) \|\| <br>       ( weighted_bipred_flag && slice_type == B ) ) | |
| |       pred_weight_table( ) | |
| 1738 |     ~~five_minus_max_num_merge_cand~~ | ~~ue(v)~~ |
| 1739 |     if( adaptive_mv_resolution_enabled_flag ) | |
| |       use_integer_mv_flag | u(1) |
| 2404 |   } | |
| 2406 |   five_minus_max_num_merge_cand | ue(v) |
| | } | |
| 1740 |   slice_qp_delta | se(v) |
| |   if( pps_slice_chroma_qp_offsets_present_flag ) { | |
| |     slice_cb_qp_offset | se(v) |
| |     slice_cr_qp_offset | se(v) |
| |   } | |

MODIFICATION OF UNIFICATION OF INTRA BLOCK COPY AND INTER SIGNALING RELATED SYNTAX AND SEMANTICS

CROSS-REFERENCE TO RELATED APPLICATION

This application claims benefit of the following U.S. Provisional patent application, which is hereby incorporated by reference: Application Ser. No. 62/121,595, entitled "MODIFICATION OF UNIFICATION OF INTRA BLOCK COPY AND INTER SIGNALING RELATED SYNTAX AND SEMANTICS," by Yue Yu, Zhouye Gu and Limin Wang, filed Feb. 27, 2015.

BACKGROUND

1. Field of the Invention

The present invention relates to systems and methods for encoding data, and in particular to a system and method for generating and processing slice headers with high efficiency video coded data.

2. Description of the Related Art

There is rapid growth in the technologies associated with the generation, transmission, and reproduction of media programs. These technologies include coding schemes that permit digital versions of the media programs to be encoded to compress them to much smaller size and facilitate their transmission, storage, reception and playback. These technologies have application in personal video recorders (PVRs), video on demand (VOD), multiple channel media program offerings, interactivity, mobile telephony, and media program transmission.

Without compression, digital media programs are typically too large to transmit and/or store for a commercially acceptable cost. However, compression of such programs has made the transmission and storage of such digital media programs not only commercially feasible, but commonplace.

Initially, the transmission of media programs involved low to medium resolution images transmitted over high bandwidth transmission media such as cable television and satellite. However, such transmission has evolved to include lower bandwidth transmission media such as Internet transmission to fixed and mobile devices via computer networks, WiFi, Mobile TV and third and fourth generation (3G and 4G) networks. Further, such transmissions have also evolved to include high definition media programs such as high definition television (HDTV), which have significant transmission bandwidth and storage requirements.

The High Efficiency Video Coding (HEVC) coding standard (or H.265) is the most recent coding standard promulgated by the ISO/IEC MPEG standardization organizations. The coding standard preceding HEVC included the H.262/MPEG-2 and the subsequent H.264/MPEG-4 Advanced Video Coding (AVC) standard. H.264/MPEG-4 has substantially replaced H.262/MPEG-2 in many application including high definition (HD) television. HEVC supports resolutions higher than HD, even in stereo or multi-view embodiments, and is more suitable for mobile devices such as tablet personal computers. Further information regarding HEVC can be found in the publication "Overview of the High Efficiency Video Coding (HEVC) Standard, by Gary J. Sullivan, Jens-Rainer Ohm, Woo-Jin Han and Thomas Wiegand, IEEE Transactions on Circuits and Systems for Video Technology, December 2012, which is hereby incorporated by reference herein.

As in other coding standards, the bitstream structure and syntax of HEVC compliant data are standardized, such that every decoder conforming to the standard will produce the same output when provided with the same input. Some of the features incorporated into the HEVC standard include the definition and processing of a slice, one or more of which may together comprise one of the pictures in a video sequence. A video sequence comprises a plurality of pictures, and each picture may comprise one or more slices. Slices include non-dependent slices and dependent slices. A non-dependent slice (hereinafter simply referred to as a slice) is a data structure that can be decoded independently from other slices of the same picture in terms of entropy encoding, signal prediction, and residual signal construction. This data structure permits resynchronization of events in case of data losses. A "dependent slice" is a structure that permits information about the slice (such as those related with tiles within the slice or wavefront entries) to be carried to the network layer, thus making that data available to a system to more quickly process fragmented slices. Dependent slices are mostly useful for low-delay encoding.

HEVC and legacy coding standards define a parameter set structure that offers improved flexibility for operation over a wide variety of applications and network environments, and improved robustness to data losses. Parameter sets contain information that can be shared for decoding of different portions of the encoded video. The parameter set structure provides a secure mechanism for conveying data that is essential to the decoding process. H.264 defined both sequence parameter sets (SPS) that describe parameters for decoding a sequence of pictures and a picture parameter set (PPS) that describes parameters for decoding a picture of the sequence of pictures. HEVC introduces a new parameter set, the video parameter set (VPS).

The encoding and decoding of slices is performed according to information included in a slice header. The slice header includes syntax and logic for reading flags and data that are used in decoding the slice.

Like its predecessors, HEVC supports both temporal and spatial encoding of picture slices. HEVC defines slices to include I-slices, which are spatially, but not temporally encoded with reference to another slice. I-slices are alternatively described as "intra" slice encoded. HEVC also defines slices to include P (predictive) slices, which are spatially encoded and temporally encoded with reference to another slice. P-slices are alternatively described as "inter" slice encoded. HEVC also describes slices to include bi-predictive (B)-slices. B-slices are spatially encoded and temporally encoded with reference to two or more other slices. Further, HEVC consolidates the notion of P and B slices into general B slices that can be used as reference slice.

Motion compensation is one of the key technologies used in HEVC. Such technologies take advantage of correlation between temporally adjacent pictures to reduce the bandwidth required to represent the video signal. Similar techniques (known as Intra block copying, intraBC) have been employed to try to reduce bandwidth by taking advantages of block similarities within the same picture. Initial attempts at such coding were of limited success because textual patterns in spatially neighboring areas may be similar to the current coding block, but typically change gradually over space. Thus, it is difficult to find a block closely matching the current block within the same picture, thus limiting coding efficiency improvements. However, with some screen content, spatial correlation among blocks within the same picture can be significant. For example, video with text and graphics typically present repetitive patterns within the same picture, and for such video content, intraBC can effectively reduce bandwidth requirements. Consequently, the HEVC standard includes provision for an Intra block copying mode. In the intraBC, a prediction unit (PU) is predicted from a previously reconstructed block within the same picture. Analogous to a PU in motion compensation between frames, a displacement vector (called a block vector or BV) is used to signal the relative displacement from the position of the current PU to that of the reference block. The prediction errors after compensation are then coded in the same fashion as how the inter residuals are coded in inter-picture coding.

Since the intraBC copy and Inter mode of HEVC are similar in many respects, the intraBC can be considered to be a special inter mode which uses the current reconstructed area in the current picture as a reference. Because of such similarities, synergies between intraBC and Inter mode suggest that signaling and other processing enhancements may be available if the two concepts are unified (for example, see Chao Pang, Ye-Kui Wang, Vadim Seregin, Krishna Rapaka, Marta Karczewicz, Xiaozhong Xu, Shan Liu, Shawmin Lei, Bin Li, Jizheng Xu, "Non-CE2 Test1: Intra block copy and inter signalling unification," Document of Joint Collaborative Team on Video Coding, JCTVC-T0227, 20th Meeting: Geneva, CH, 10-18 Feb. 2015, which is hereby incorporated by reference herein). This disclosure presents such enhancements.

SUMMARY

To address the requirements described above, this document discloses a method and apparatus for processing a slice of a current picture. In one embodiment, a method is disclosed which determines if the slice of the current picture excludes any predictive coding derived from another picture. If the slice of the current picture is designated to exclude any predictive coding derived from another picture, a flag is set to a first logic state, and if the slice of the current picture is not designated to exclude any predictive coding derived from another picture, the flag is set to a second logic state. Further, at least a portion of predicted weight processing of the slice of the current picture is bypassed according to the logic state of the flag. In another embodiment, an apparatus is disclosed that includes a processor responsive to instructions stored in a communicatively coupled memory, wherein the instructions comprise instructions for performing the above operations.

BRIEF DESCRIPTION OF THE DRAWINGS

Referring now to the drawings in which like reference numbers represent corresponding parts throughout:

FIG. 1 is a diagram depicting an exemplary embodiment of a video coding-decoding system that can be used for transmission and/or storage and retrieval of audio and/or video information;

FIGS. 16A and 16B are diagrams presenting a baseline PPS syntax;

FIGS. 17A-17C are diagrams presenting a baseline slice header logic and syntax;

FIG. 22 is a diagram illustrating an exemplary modification of the slice segment header syntax;

FIG. 23 is a diagram illustrating an exemplary modification of the slice segment header syntax for this second embodiment;

FIG. 24 is a diagram illustrating an exemplary modification of the slice segment header syntax for this second embodiment.

DETAILED DESCRIPTION

Figure 2A:
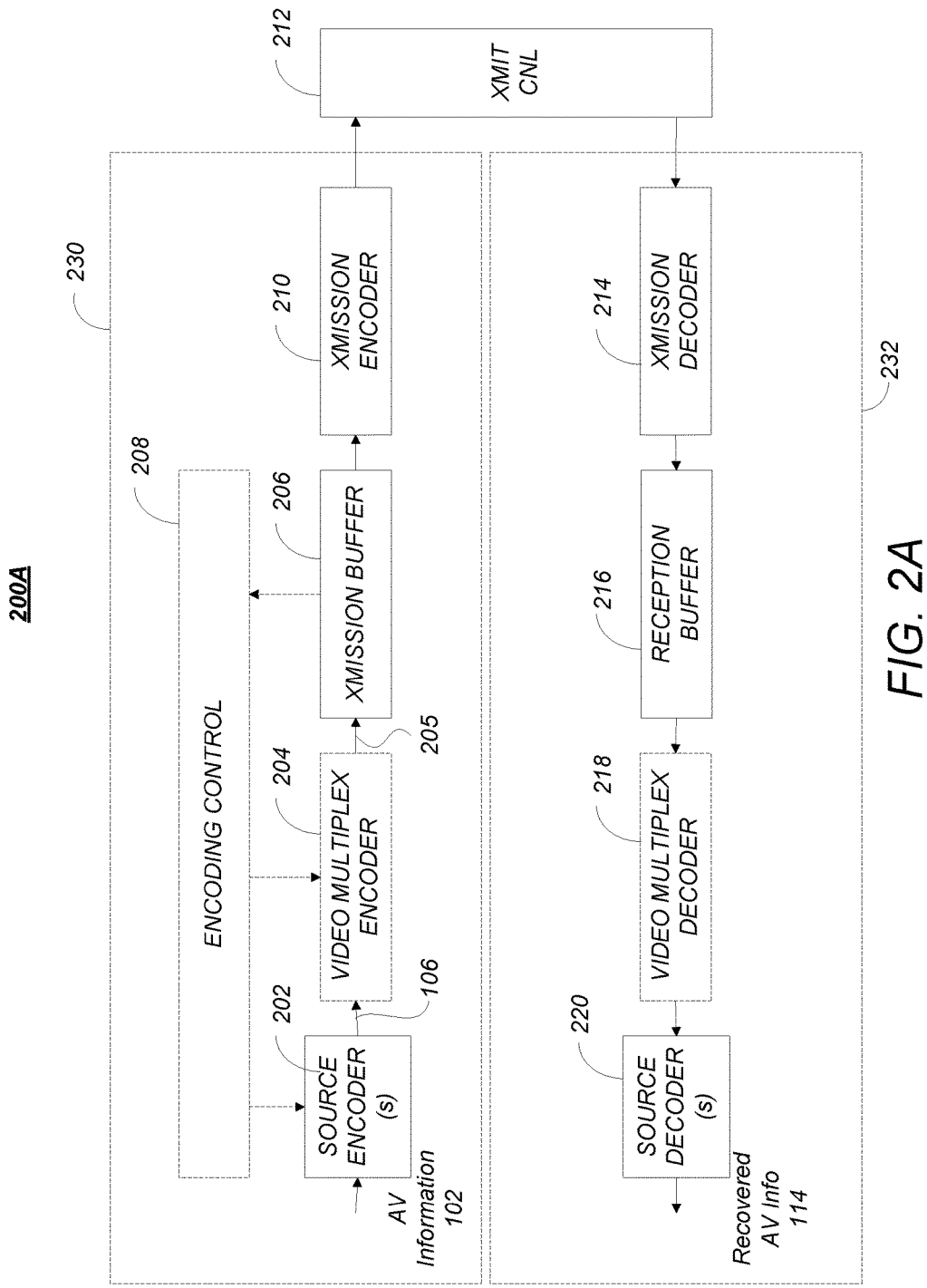
FIG. 2A is a diagram of one embodiment of a codec system in which the encoded AV information is transmitted to and received at another location.

In the following description, reference is made to the accompanying drawings which form a part hereof, and which is shown, by way of illustration, several embodiments of the present invention. It is understood that other embodiments may be utilized and structural changes may be made without departing from the scope of the present invention.

Audio-Visual Information Transception and Storage

FIG. 1 is a diagram depicting an exemplary embodiment of a video coding-decoding (codec) system 100 that can be used for transmission and/or storage and retrieval of audio and/or video information. The codec system 100 comprises an encoding system 104, which accepts audio-visual (AV) information 102 and processes the AV information 102 to generate encoded (compressed) AV information 106, and a decoding system 112, which processes the encoded AV information 106 to produce recovered AV information 114. Since the encoding and decoding processes are not lossless, the recovered AV information 114 is not identical to the initial AV information 102, but with judicious selection of the encoding processes and parameters, the differences between the recovered AV information 114 and the unprocessed AV information 102 are acceptable to human perception.

The encoded AV information 106 is typically transmitted or stored and retrieved before decoding and presentation, as performed by transception (transmission and reception) or storage/retrieval system 108. Transception losses may be significant, but storage/retrieval losses are typically minimal or non-existent, hence, the transcepted AV information 110 provided to the decoding system 112 is typically the same as or substantially the same as the encoded AV information 106.

FIG. 2A is a diagram of one embodiment of a codec system 200A in which the encoded AV information 106 is transmitted to and received at another location. A transmission segment 230 converts an input AV information 102 into a signal appropriate for transmission and transmits the converted signal over the transmission channel 212 to the reception segment 232. The reception segment 232 receives the transmitted signal, and converts the received signal into the recovered AV information 114 for presentation. As described above, due to coding and transmission losses and errors, the recovered AV information 114 may be of lower quality than the AV information 102 that was provided to the transmission segment 230. However, error-correcting systems may be included to reduce or eliminate such errors. For example, the encoded AV information 106 may be forward error correction (FEC) encoded by adding redundant information, and such redundant information can be used to identify and eliminate errors in the reception segment 230.

The transmission segment 102 comprises one or more source encoders 202 to encode multiple sources of AV information 102. The source encoder 202 encodes the AV information 102 primarily for purposes of compression to produce the encoded AV information 106, and may include, for example a processor and related memory storing instructions implementing a codec such as MPEG-1, MPEG-2, MPEG-4 AVC/H.264, HEVC or similar codec, as described further below.

The codec system 200A may also include optional elements indicated by the dashed lines in FIG. 2A. These optional elements include a video multiplex encoder 204, an encoding controller 208, and a video demultiplexing decoder 218. The optional video multiplex encoder 204 multiplexes encoded AV information 106 from an associated plurality of source encoder(s) 202 according to one or more parameters supplied by the optional encoding controller 208. Such multiplexing is typically accomplished in the time domain and is data packet based.

In one embodiment, the video multiplex encoder 204 comprises a statistical multiplexer, which combines the encoded AV information 106 from a plurality of source encoders 202 so as to minimize the bandwidth required for transmission. This is possible, since the instantaneous bit rate of the coded AV information 106 from each source encoder 202 can vary greatly with time according to the content of the AV information 102. For example, scenes having a great deal of detail and motion (e.g. sporting events) are typically encoded at higher bitrates than scenes with little motion or detail (e.g. portrait dialog). Since each source encoder 202 may produce information with a high instantaneous bitrate while another source encoder 202 produces information with a low instantaneous bit rate, and since the encoding controller 208 can command the source encoders 202 to encode the AV information 106 according to certain performance parameters that affect the instantaneous bit rate, the signals from each of the source encoders 106 (each having a temporally varying instantaneous bit rate) can be combined together in an optimal way to minimize the instantaneous bit rate of the multiplexed stream 205.

As described above, the source encoder 202 and the video multiplex coder 204 may optionally be controlled by a coding controller 208 to minimize the instantaneous bit rate of the combined video signal. In one embodiment, this is accomplished using information from a transmission buffer 206 which temporarily stores the coded video signal and can indicate the fullness of the buffer 206. This allows the coding performed at the source encoder 202 or video multiplex coder 204 to be a function of the storage remaining in the transmission buffer 206.

The transmission segment 230 also may comprise a transmission encoder 210, which further encodes the video signal for transmission to the reception segment 232. Transmission encoding may include for example, the aforementioned FEC coding and/or coding into a multiplexing scheme for the transmission medium of choice. For example, if the transmission is by satellite or terrestrial transmitters, the transmission encoder 114 may encode the signal into a signal constellation before transmission via quadrature amplitude modulation (QAM) or similar modulation technique. Also, if the encoded video signal is to be streamed via an Internet protocol device and the Internet, the transmission encodes the signal according to the appropriate protocol. Further, if the encoded signal is to be transmitted via mobile telephony, the appropriate coding protocol is used, as further described below.

The reception segment 232 comprises a transmission decoder 214 to receive the signal that was coded by the transmission coder 210 using a decoding scheme complementary to the coding scheme used in the transmission encoder 214. The decoded received signal may be temporarily stored by optional reception buffer 216, and if the received signal comprises multiple video signals, the received signal is multiplex decoded by video multiplex decoder 218 to extract the video signal of interest from the video signals multiplexed by the video multiplex coder 204. Finally, the video signal of interest is decoded by source decoder 220 using a decoding scheme or codec complementary to the codec used by the source encoder 202 to encode the AV information 102.

In one embodiment, the transmitted data comprises a packetized video stream transmitted from a server (representing the transmitting segment 230) to a client (representing the receiving segment 232). In this case, the transmission encoder 210 may packetize the data and embed network abstract layer (NAL) units in network packets. NAL units define a data container that has header and coded elements, and may correspond to a video frame or other slice of video data.

The compressed data to be transmitted may packetized and transmitted via transmission channel 212, which may include a Wide Area Network (WAN) or a Local Area Network (LAN). Such a network may comprise, for example, a wireless network such as WiFi, an Ethernet network, an Internet network or a mixed network composed of several different networks. Such communication may be affected via a communication protocol, for example Real-time Transport Protocol (RTP), User Datagram Protocol (UDP) or any other type of communication protocol. Different packetization methods may be used for each network abstract layer (NAL) unit of the bitstream. In one case, one NAL unit size is smaller than the maximum transport unit (MTU) size corresponding to the largest packet size that can be transmitted over the network without being fragmented. In this case, the NAL unit is embedded into a single network packet. In another case, multiple entire NAL units are included in a single network packet. In a third case, one NAL unit may be too large to be transmitted in a single network packet and is thus split into several fragmented NAL units with each fragmented NAL unit being transmitted in an individual network packet. Fragmented NAL unit are typically sent consecutively for decoding purposes.

The reception segment 232 receives the packetized data and reconstitutes the NAL units from the network packet. For fragmented NAL units, the client concatenates the data from the fragmented NAL units in order to reconstruct the original NAL unit. The client 232 decodes the received and reconstructed data stream and reproduces the video images on a display device and the audio data by a loud speaker.

Figure 2B:
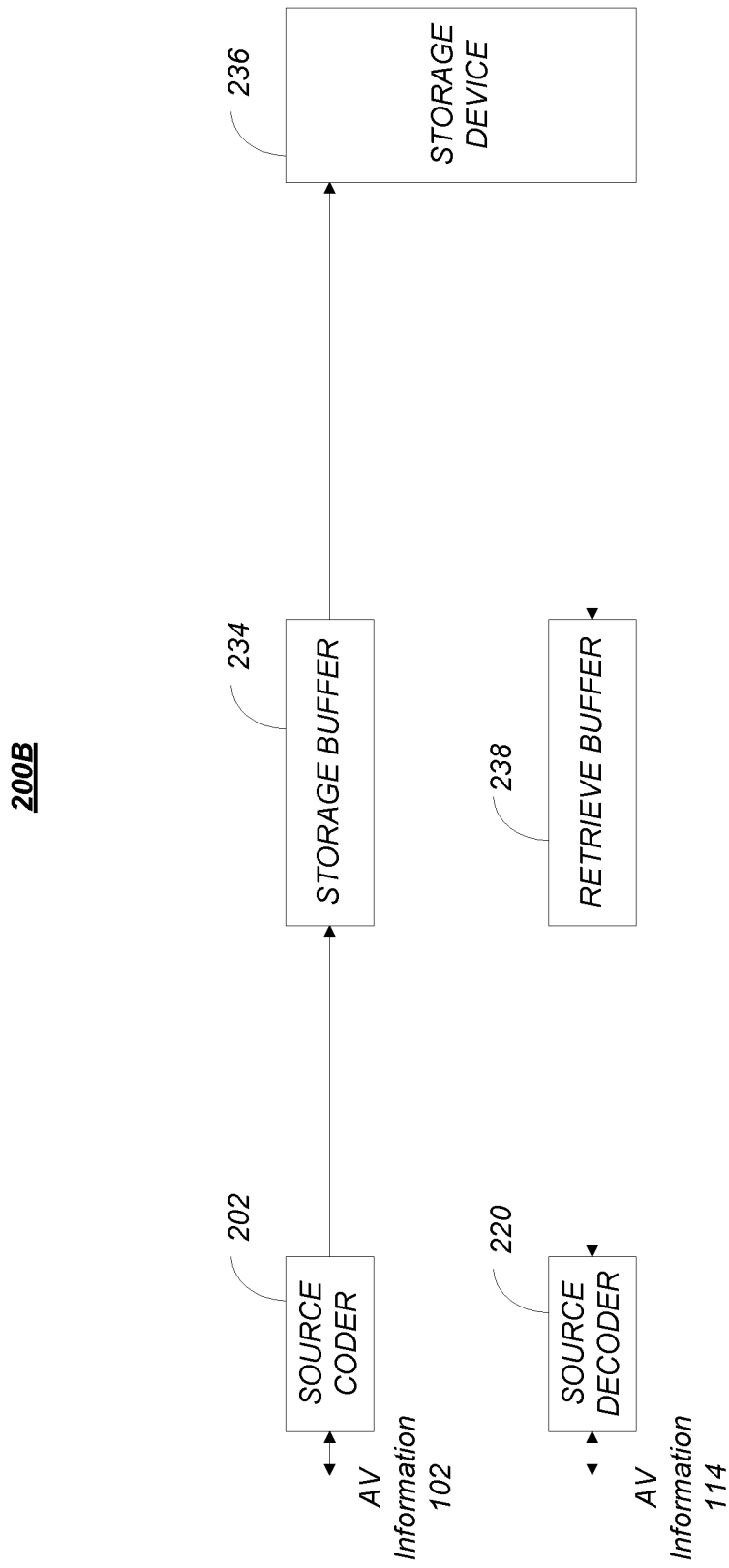
FIG. 2B is a diagram depicting an exemplary embodiment of codec system in which the encoded information is stored and later retrieved for presentation, hereinafter referred to as codec storage system.

FIG. 2B is a diagram depicting an exemplary embodiment of codec system in which the encoded information is stored and later retrieved for presentation, hereinafter referred to as codec storage system 200B. This embodiment may be used, for example, to locally store information in a digital video recorder (DVR), a flash drive, hard drive, or similar device. In this embodiment, the AV information 102 is source encoded by source encoder 202, optionally buffered by storage buffer 234 before storage in a storage device 236. The storage device 236 may store the video signal temporarily or for an extended period of time, and may comprise a hard drive, flash drive, RAM or ROM. The stored AV information is then retrieved, optionally buffered by retrieve buffer 238 and decoded by the source decoder 220.

Figure 2C:
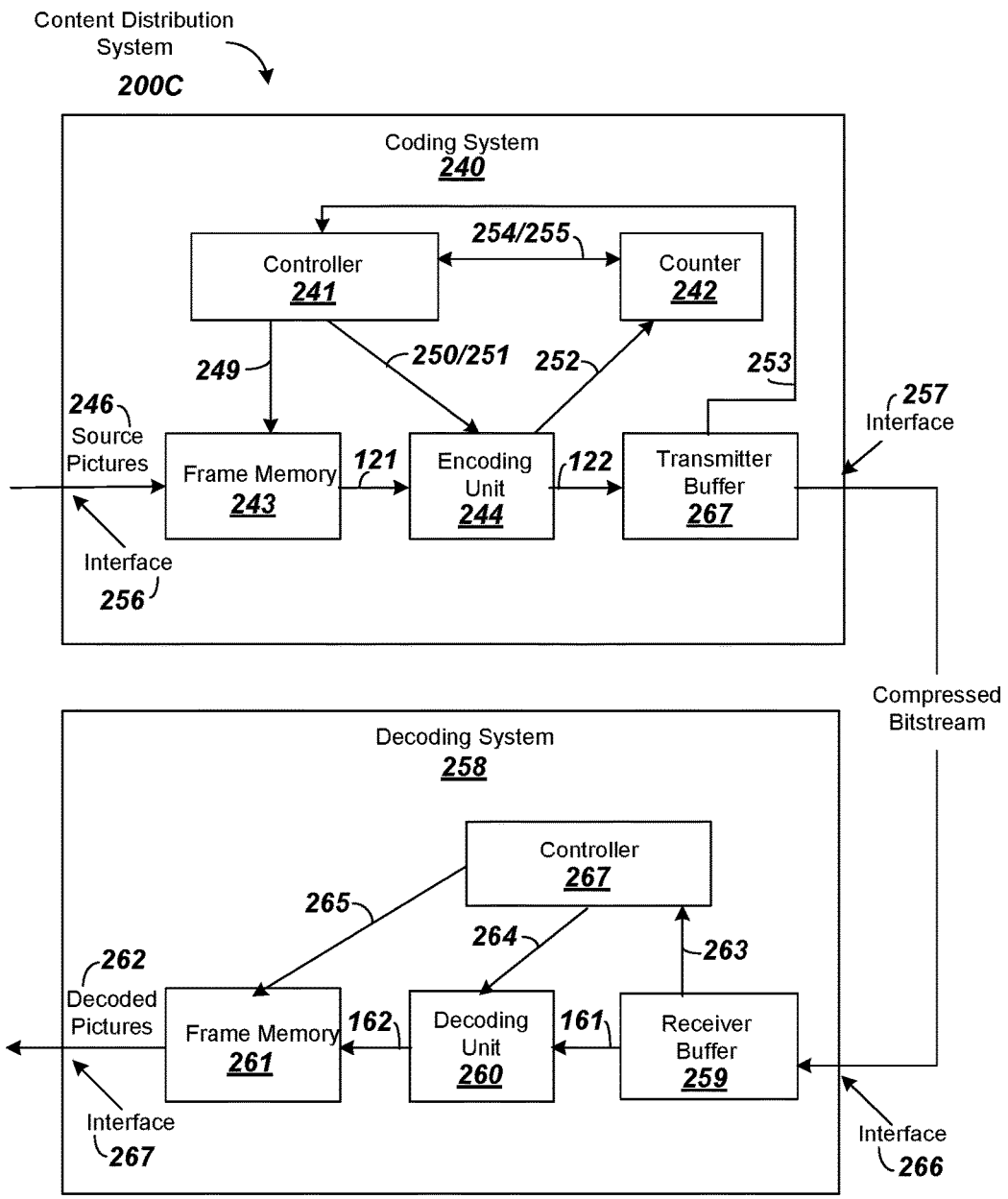
FIG. 2C is another diagram depicting an exemplary content distribution system comprising a coding system or encoder and a decoding system or decoder that can be used to transmit and receive HEVC data.

FIG. 2C is another diagram depicting an exemplary content distribution system 200C comprising a coding system or encoder 202 and a decoding system or decoder 220 that can be used to transmit and receive HEVC data. In some embodiments, the coding system 202 can comprise an input interface 256, a controller 241 a counter 242 a frame memory 243, an encoding unit 244, a transmitter buffer 267 and an output interface 257. The decoding system 220 can comprise a receiver buffer 259, a decoding unit 260, a frame memory 261 and a controller 267. The coding system 202 and the decoding system 220 can be coupled with each other via a transmission path which can carry a compressed bit stream. The controller 241 of the coding system 202 can control the amount of data to be transmitted on the basis of the capacity of the transmitter buffer 267 or receiver buffer 259 and can include other parameters such as the amount of data per a unit of time. The controller 241 can control the encoding unit 244 to prevent the occurrence of a failure of a received signal decoding operation of the decoding system 220. The controller 241 can be a processor or include, by way of a non-limiting example, a microcomputer having a processor, a random access memory and a read only memory.

Source pictures 246 supplied from, by way of a non-limiting example, a content provider can include a video sequence of frames including source pictures in a video sequence. The source pictures 246 can be uncompressed or compressed. If the source pictures 246 are uncompressed, the coding system 202 can have an encoding function. If the source pictures 246 are compressed, the coding system 202 can have a transcoding function. Coding units can be derived from the source pictures utilizing the controller 241. The frame memory 243 can have a first area that can be used for storing the incoming frames from the source pictures 246 and a second area that can be used for reading out the frames and outputting them to the encoding unit 244. The controller 241 can output an area switching control signal 249 to the frame memory 243. The area switching control signal 249 can indicate whether the first area or the second area is to be utilized.

The controller 241 can output an encoding control signal 250 to the encoding unit 244. The encoding control signal 250 can cause the encoding unit 202 to start an encoding operation, such as preparing the Coding Units based on a source picture. In response to the encoding control signal 250 from the controller 241, the encoding unit 244 can begin to read out the prepared Coding Units to a high-efficiency encoding process, such as a prediction coding process or a transform coding process which process the prepared Coding Units generating video compression data based on the source pictures associated with the Coding Units.

The encoding unit 244 can package the generated video compression data in a packetized elementary stream (PES) including video packets. The encoding unit 244 can map the video packets into an encoded video signal 248 using control information and a program time stamp (PTS) and the encoded video signal 248 can be transmitted to the transmitter buffer 267.

The encoded video signal 248, including the generated video compression data, can be stored in the transmitter buffer 267. The information amount counter 242 can be incremented to indicate the total amount of data in the transmitter buffer 267. As data is retrieved and removed from the buffer, the counter 242 can be decremented to reflect the amount of data in the transmitter buffer 267. The occupied area information signal 253 can be transmitted to the counter 242 to indicate whether data from the encoding unit 244 has been added or removed from the transmitter buffer 267 so the counter 242 can be incremented or decremented. The controller 241 can control the production of video packets produced by the encoding unit 244 on the basis of the occupied area information 253 which can be communicated in order to anticipate, avoid, prevent, and/or detect an overflow or underflow from taking place in the transmitter buffer 267.

The information amount counter 242 can be reset in response to a preset signal 254 generated and output by the controller 241. After the information amount counter 242 is reset, it can count data output by the encoding unit 244 and obtain the amount of video compression data and/or video packets, which have been generated. The information amount counter 242 can supply the controller 241 with an information amount signal 255 representative of the obtained amount of information. The controller 241 can control the encoding unit 244 so that there is no overflow at the transmitter buffer 267.

In some embodiments, the decoding system 220 can comprise an input interface 266, a receiver buffer 259, a controller 267, a frame memory 261, a decoding unit 260 and an output interface 267. The receiver buffer 259 of the decoding system 220 can temporarily store the compressed bit stream, including the received video compression data and video packets based on the source pictures from the source pictures 246. The decoding system 220 can read the control information and presentation time stamp information associated with video packets in the received data and output a frame number signal 263 which can be applied to the controller 220. The controller 267 can supervise the counted number of frames at a predetermined interval. By way of a non-limiting example, the controller 267 can supervise the counted number of frames each time the decoding unit 260 completes a decoding operation.

In some embodiments, when the frame number signal 263 indicates the receiver buffer 259 is at a predetermined capacity, the controller 267 can output a decoding start signal 264 to the decoding unit 260. When the frame number signal 263 indicates the receiver buffer 259 is at less than a predetermined capacity, the controller 267 can wait for the occurrence of a situation in which the counted number of frames becomes equal to the predetermined amount. The controller 267 can output the decoding start signal 263 when the situation occurs. By way of a non-limiting example, the controller 267 can output the decoding start signal 264 when the frame number signal 263 indicates the receiver buffer 259 is at the predetermined capacity. The encoded video packets and video compression data can be decoded in a monotonic order (i.e., increasing or decreasing) based on presentation time stamps associated with the encoded video packets.

In response to the decoding start signal 264, the decoding unit 260 can decode data amounting to one picture associated with a frame and compressed video data associated with the picture associated with video packets from the receiver buffer 259. The decoding unit 260 can write a decoded video signal 269 into the frame memory 261. The frame memory 261 can have a first area into which the decoded video signal is written, and a second area used for reading out decoded pictures 262 to the output interface 267.

In various embodiments, the coding system 202 can be incorporated or otherwise associated with a transcoder or an encoding apparatus at a headend and the decoding system 220 can be incorporated or otherwise associated with a downstream device, such as a mobile device, a set top box or a transcoder.

Source Encoding/Decoding

As described above, the encoders 202 employ compression algorithms to generate bit streams and/or files of smaller size than the original video sequences in the AV information 102. Such compression is made possible by reducing spatial and temporal redundancies in the original sequences.

Prior art encoders 202 include those compliant with the video compression standard H.264/MPEG-4 AVC ("Advanced Video Coding") developed by between the "Video Coding Expert Group" (VCEG) of the ITU and the "Moving Picture Experts Group" (MPEG) of the ISO, in particular in the form of the publication "Advanced Video Coding for Generic Audiovisual Services" (March 2005), which is hereby incorporated by reference herein.

HEVC "High Efficiency Video Coding" (sometimes known as H.265) is expected to replace the H.264/MPEG-4 AVC. HEVC introduces new coding tools and entities that are generalizations of the coding entities defined in H.264/AVC, as further described below.

Figure 3:
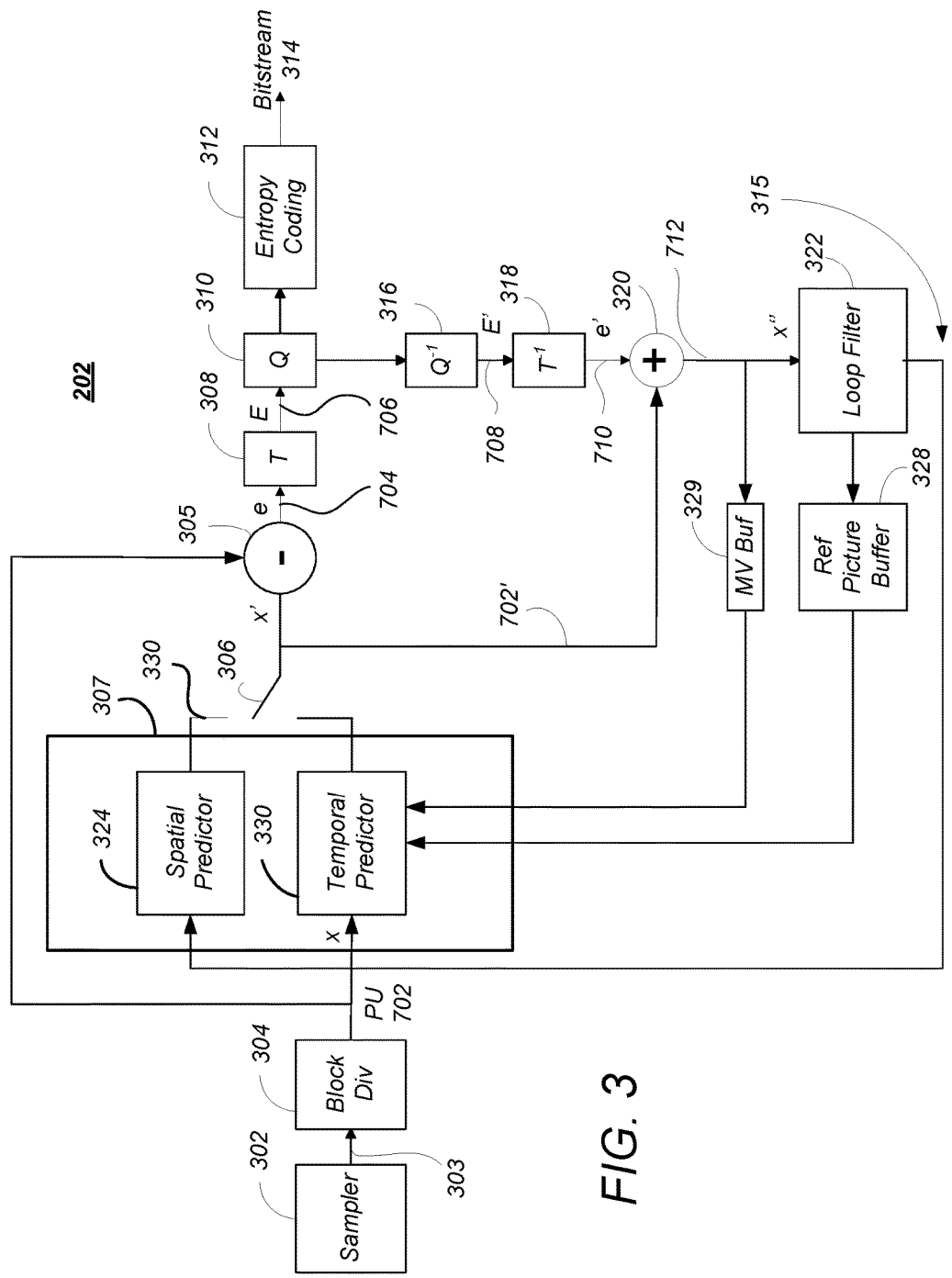
FIG. 3 is a block diagram illustrating one embodiment of the source encoder.

FIG. 3 is a block diagram illustrating one embodiment of the source encoder 202. The source encoder 202 accepts AV information 102 and uses sampler 302 sample the AV information 102 to produce a sequence 303 of successive of digital images or pictures, each having a plurality of pixels. A picture can comprise a frame or a field, wherein a frame is a complete image captured during a known time interval, and a field is the set of odd-numbered or even-numbered scanning lines composing a partial image.

The sampler 302 produces an uncompressed picture sequence 303. Each digital picture can be represented by one or more matrices having a plurality of coefficients that represent information about the pixels that together comprise the picture. The value of a pixel can correspond to luminance or other information. In the case where several components are associated with each pixel (for example red-green-blue components or luminance-chrominance components), each of these components may be separately processed.

Images can be segmented into "slices," which may comprise a portion of the picture or may comprise the entire picture. In the H.264 standard, these slices are divided into coding entities called macroblocks (generally blocks of size 16 pixels×16 pixels) and each macroblock may in turn be divided into different sizes of data blocks 102, for example 4×4, 4×8, 8×4, 8×8, 8×16, 16×8. HEVC expands and generalizes the notion of the coding entity beyond that of the macroblock.

HEVC Coding Entities: CTU, CU, PU and TU

Like other video coding standards, HEVC is a block-based hybrid spatial and temporal predictive coding scheme. However, HEVC introduces new coding entities that are not included with H.264/AVC standard. These coding entities include (1) Coding tree block (CTUs), coding units (CUs), the predictive units (PUs) and transform units (TUs) and are further described below.

Figure 4:
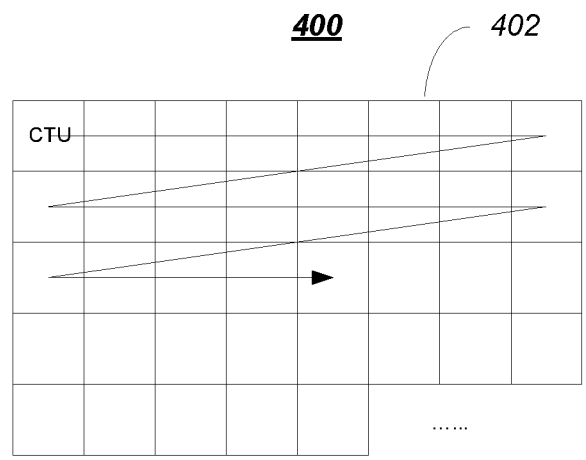
FIG. 4 is a diagram depicting a picture of AV information, such as one of the pictures in the picture sequence.

FIG. 4 is a diagram depicting a picture 400 of AV information 102, such as one of the pictures in the picture sequence 303. The picture 400 is spatially divided into non-overlapping square blocks known as coding tree units(s), or CTUs 402. Unlike H.264 and previous video coding standards where the basic coding unit is macroblock of 16×16 pixels, the CTU 402 is the basic coding unit of HEVC, and can be as large as 128×128 pixels. As shown in FIG. 4, the CTUs 402 are typically referenced within the picture 400 in an order analogous to a progressive scan.

Each CTU 402 may in turn be iteratively divided into smaller variable size coding units described by a "quadtree" decomposition further described below. Coding units are regions formed in the image to which similar encoding parameters are applied and transmitted in the bitstream 314.

Figure 5:
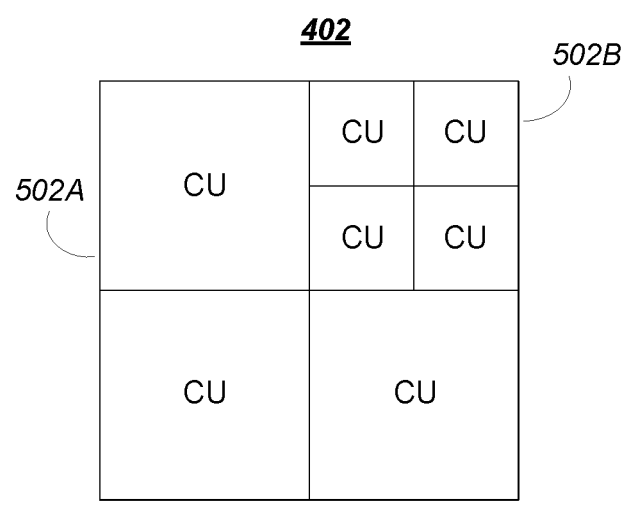
FIG. 5 is a diagram showing an exemplary partition of a coding tree block into coding units.

FIG. 5 is a diagram showing an exemplary partition of an CTU 402 into coding units (CUs) such as coding unit 502A and 502B (hereinafter alternatively referred to as coding unit(s) 502). A single CTU 402 can be divided into four CUs 502 such as CU 502A, each a quarter of the size of CTU 402. Each such divided CU 502A can be further divided into four smaller CUs 502B of quarter size of initial CU 502A.

The division of CTUs 402 into CUs 502A and into smaller CUs 502B is described by "quadtree" data parameters (e.g. flags or bits) that are encoded into the output bitstream 314 along with the encoded data as overhead known as syntax.

Figure 6:
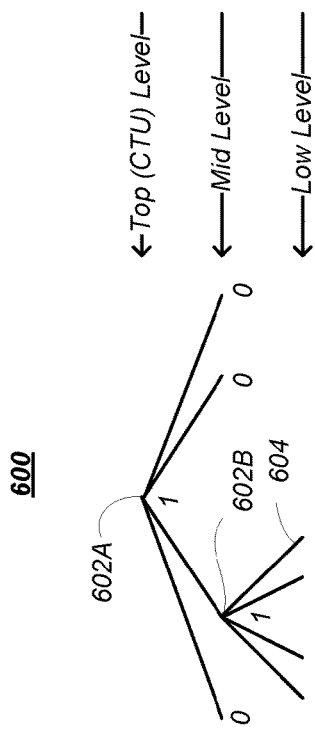
FIG. 6 is a diagram illustrating a representation of a representative quadtree and data parameters for the code tree block partitioning shown in FIG. 5.

FIG. 6 is a diagram illustrating a representation of a representative quadtree 600 and data parameters for the CTU 402 partitioning shown in FIG. 5. The quadtree 600 comprises a plurality of nodes including first node 602A at one hierarchical level and second node 602B at a lower hierarchical level (hereinafter, quadtree nodes may be alternatively referred to as "nodes" 602). At each node 602 of a quadtree, a "split flag" or bit "1" is assigned if the node 602 is further split into sub-nodes, otherwise a bit "0" is assigned.

For example, the CTU 402 partition illustrated in FIG. 5 can be represented by the quadtree 600 presented in FIG. 6, which includes a split flag of "1" associated with node 602A at the top CU 502 level (indicating there are 4 additional nodes at a lower hierarchical level). The illustrated quadtree 600 also includes a split flag of "1" associated with node 602B at the mid CU 502 level to indicate that this CU is also partitioned into four further CUs 502 at the next (bottom) CU level. The source encoder 202 may restrict the minimum and maximum CU 502 sizes, thus changing the maximum possible depth of the CU 502 splitting.

The encoder 202 generates encoded AV information 106 in the form of a bitstream 314 that includes a first portion having encoded data for the CUs 502 and a second portion that includes overhead known as syntax elements. The encoded data includes data corresponding to the encoded CUs 502 (i.e. the encoded residuals together with their associated motion vectors, predictors, or related residuals as described further below). The second portion includes syntax elements that may represent encoding parameters which do not directly correspond to the encoded data of the blocks. For example, the syntax elements may comprise an address and identification of the CU 502 in the image, a quantization parameter, an indication of the elected Inter/Intra coding mode, the quadtree 600 or other information.

CUs 502 correspond to elementary coding elements and include two related sub-units: prediction units (PUs) and a transform units (TUs), both of which have a maximum size equal to the size of the corresponding CU 502.

Figure 7:
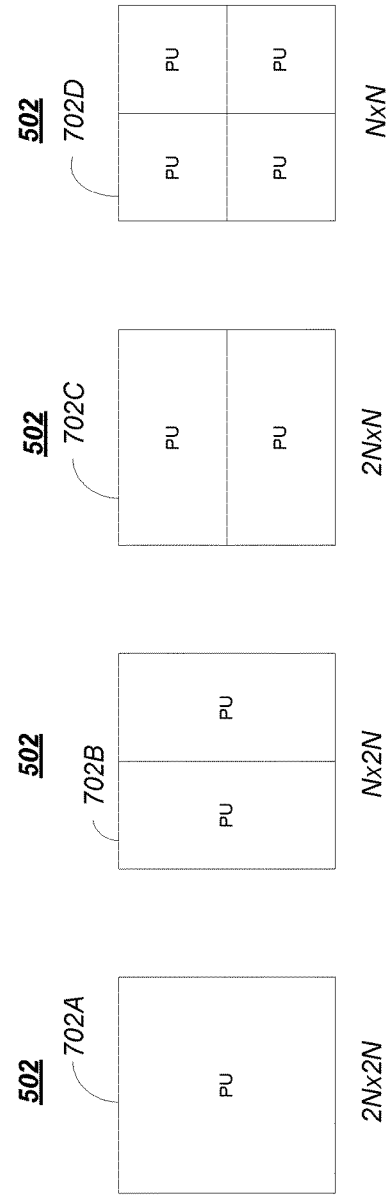
FIG. 7 is a diagram illustrating the partition of a coding unit into one or more prediction units.

FIG. 7 is a diagram illustrating the partition of a CU 502 into one or more PUs 702. A PU 702 corresponds to a partitioned CU 502 and is used to predict pixels values for intra-picture or inter-picture types. PUs 702 are an extension of the partitioning of H.264/AVC for motion estimation, and are defined for each CU 502 that is not further subdivided into other CUs ("split flag"=0). At each leaf 604 of the quadtree 600, a final (bottom level) CU 502 of 2N×2N can possess one of four possible patterns of PUs: 2N×2N (702A), 2N×N (702B), N×2N (702C) and N×N (702D)), as shown in FIG. 7.

A CU 502 can be either spatially or temporally predictive coded. If a CU 502 is coded in "intra" mode, each PU 702 of the CU 502 can have its own spatial prediction direction and image information as further described below. Also, in the "intra" mode, the PU 702 of the CU 502 may depend on another CU 502 because it may use a spatial neighbor, which is in another CU. If a CU 502 is coded in "inter" mode, each PU 702 of the CU 502 can have its own motion vector(s) and associated reference picture(s) as further described below.

Figure 8:
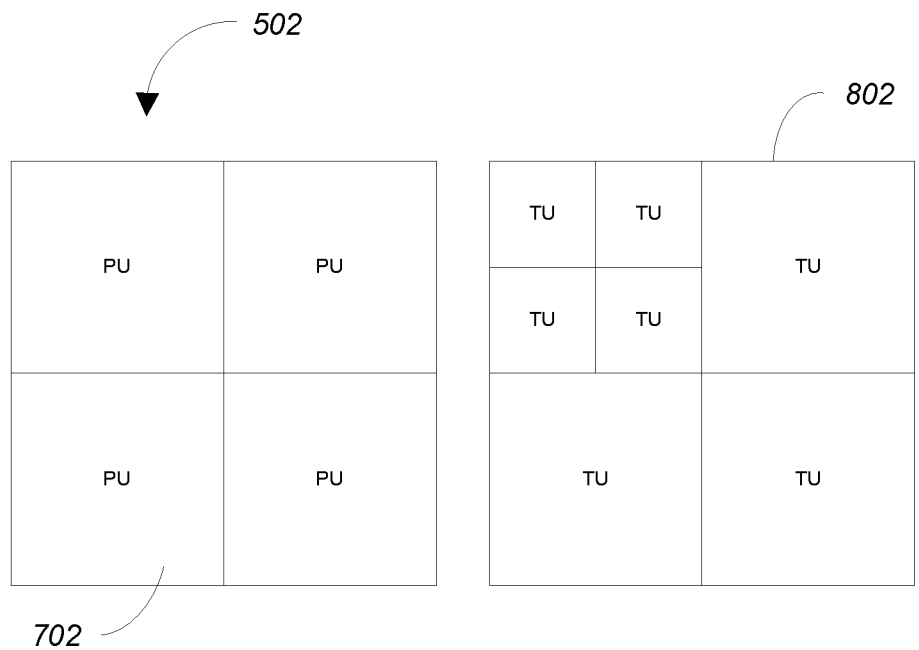
FIG. 8 is a diagram showing a coding unit partitioned into four prediction units and an associated set of transform units.

FIG. 8 is a diagram showing a CU 502 partitioned into four PUs 702 and an associated set of transform units (TUs) 802. TUs 802 are used to represent the elementary units that are spatially transformed by a DCT (Discrete Cosine Transform). The size and location of each block transform TU 802 within a CU 502 is described by a "residual" quadtree (RQT) further illustrated below.

Figure 9:
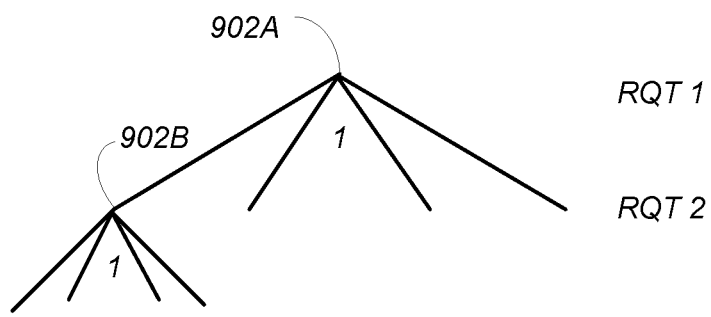
FIG. 9 is a diagram showing RQT codetree for the transform units associated with the coding unit in the example of FIG. 8.

FIG. 9 is a diagram showing RQT 900 for TUs 802 for the CU 502 in the example of FIG. 8. Note that the "1" at the first node 902A of the RQT 900 indicates that there are four branches and that the "1" at the second node 902B at the adjacent lower hierarchical level indicates that the indicated node further has four branches. The data describing the RQT 900 is also coded and transmitted as an overhead in the bitstream 314.

The coding parameters of a video sequence may be stored in dedicated NAL units called parameter sets. Two types of parameter sets NAL units may be employed. The first parameter set type is known as a Sequence Parameter Set (SPS), and comprises a NAL unit that includes parameters that are unchanged during the entire video sequence. Typically, an SPS handles the coding profile, the size of the video frames and other parameters. The second type of parameter set is known as a Picture Parameter Set (PPS), and codes different values that may change from one image to another.

Spatial and Temporal Prediction

One of the techniques used to compress a bitstream 314 is to forego the storage of pixel values themselves and instead, predict the pixel values using a process that can be repeated at the decoder 220 and store or transmit the difference between the predicted pixel values and the actual pixel values (known as the residual). So long as the decoder 220 can compute the same predicted pixel values from the information provided, the actual picture values can be recovered by adding the residuals to the predicted values. The same technique can be used to compress other data as well.

Referring back to FIG. 3, each PU 702 of the CU 502 being processed is provided to a predictor module 307. The predictor module 307 predicts the values of the PUs 702 based on information in nearby PUs 702 in the same frame (intra-frame prediction, which is performed by the spatial predictor 324) and information of PUs 702 in temporally proximate frames (inter-frame prediction, which is performed by the temporal predictor 330). Temporal prediction, however, may not always be based on a collocated PU, since collocated PUs are defined to be located at a reference/non-reference frame having the same x and y coordinates as the current PU 702. These techniques take advantage of spatial and temporal dependencies between PUs 702.

Encoded units can therefore be categorized to include two types: (1) non-temporally predicted units and (2) temporally predicted units. Non-temporally predicted units are predicted using the current frame, including adjacent or nearby PUs 702 within the frame (e.g. intra-frame prediction known as intra pictures or I-pictures), and are generated by the spatial predictor 324. Temporally predicted units are predicted from one temporal picture (e.g. predicted pictures known as P-pictures) or predicted from at least two reference pictures temporally ahead and/or behind (i.e. bi-predicted pictures known as B-pictures).

Spatial Prediction

Figure 10:
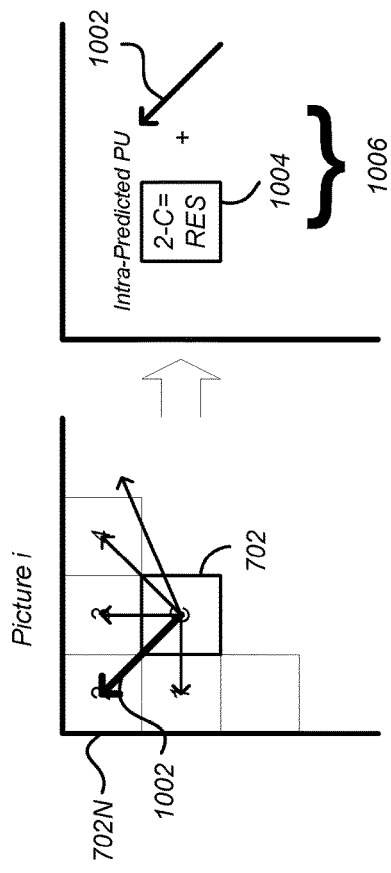
FIG. 10 is a diagram illustrating spatial prediction of prediction units.

FIG. 10 is a diagram illustrating spatial prediction of PUs 702. A picture may comprise a PU 702 and spatially proximate other PUs 1-4, including nearby PU 702N. The spatial predictor 324 predicts the current block (e.g. block C of FIG. 10) by means of an "intra-frame" prediction which uses PUs 702 of already-encoded other blocks of pixels of the current image.

The spatial predictor 324 locates a nearby PU (e.g. PU 1, 2, 3 or 4 of FIG. 10) that is appropriate for spatial coding and determines an angular prediction direction to that nearby PU. In HEVC, 35 directions can be considered, so each PU may have one of 35 directions associated with it, including horizontal, vertical, 45 degree diagonal, 135 degree diagonal, DC etc. The spatial prediction direction of the PU is indicated in the syntax.

Referring back to the spatial predictor 324 of FIG. 3, this located nearby PU is used to compute a residual PU 704 (*e*) as the difference between the pixels of the nearby PU 702N and the current PU 702, using element 305. The result is an intra-predicted PU element 1006 that comprises a prediction direction 1002 and the intra-predicted residual PU 1004. The prediction direction 1002 may be coded by inferring the direction from spatially proximate PUs, and the spatial dependencies of the picture, enabling the coding rate of the intra prediction direction mode to be reduced.

Temporal Prediction

Figure 11:
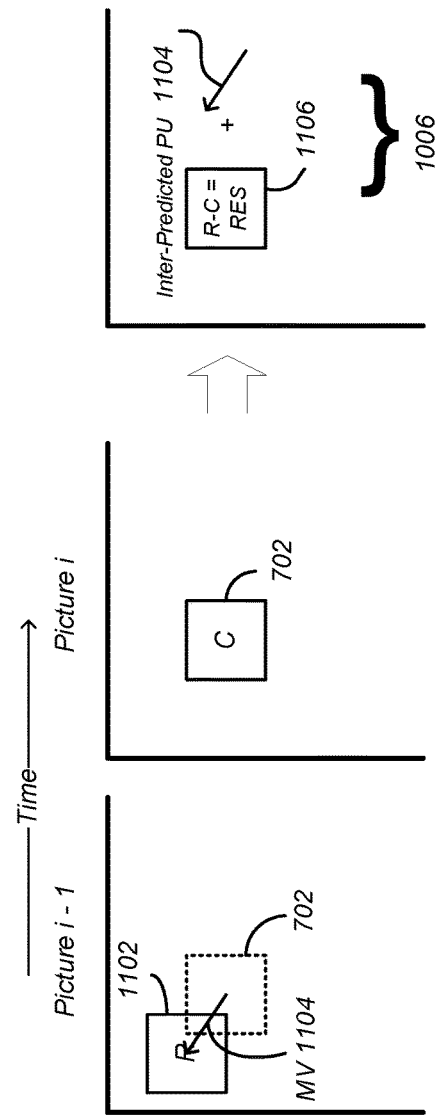
FIG. 11 is a diagram illustrating temporal prediction.

FIG. 11 is a diagram illustrating temporal prediction. Temporal prediction considers information from temporally neighboring pictures or frames, such as the previous picture, picture i-1.

Generally, temporal prediction includes single-prediction (P-type), which predicts the PU 702 by referring to one reference area from only one reference picture, and multiple prediction (B-type), which predicts the PU by referring to two reference areas from one or two reference pictures. Reference images are images in the video sequence that have already been coded and then reconstructed (by decoding).

The temporal predictor 330 identifies, in one or several of these reference areas (one for P-type or several for B-type), areas of pixels in a temporally nearby frame so that they can be used as predictors of this current PU 702. In the case where several areas predictors are used (B-type), they may be merged to generate one single prediction. The reference area 1102 is identified in the reference frame by a motion vector (MV) 1104 that is defines the displacement between the current PU 702 in current frame (picture i) and the reference area 1102 (refIdx) in the reference frame (picture i-1). A PU in a B-picture may have up to two MVs. Both MV and refIdx information are included in the syntax of the HEVC bitstream.

Referring again to FIG. 3, a difference between the pixel values between of the reference area 1102 and the current PU 702 may be computed by element 305 as selected by switch 306. This difference is referred to as the residual of the inter-predicted PU 1106. At the end of the temporal or inter-frame prediction process, the current PU 1006 is composed of one motion vector MV 1104 and a residual 1106.

However, as described above, one technique for compressing data is to generate predicted values for the data using means repeatable by the decoder 220, computing the difference between the predicted and actual values of the data (the residual) and transmitting the residual for decoding. So long as the decoder 220 can reproduce the predicted values, the residual values can be used to determine the actual values.

This technique can be applied to the MVs 1104 used in temporal prediction by generating a prediction of the MV 1104, computing a difference between the actual MV 1104 and the predicted MV 1104 (a residual) and transmitting the MV residual in the bitstream 314. So long as the decoder 220 can reproduce the predicted MV 1104, the actual MV 1104 can be computed from the residual. HEVC computes a predicted MV for each PU 702 using the spatial correlation of movement between nearby PUs 702.

Figure 12:
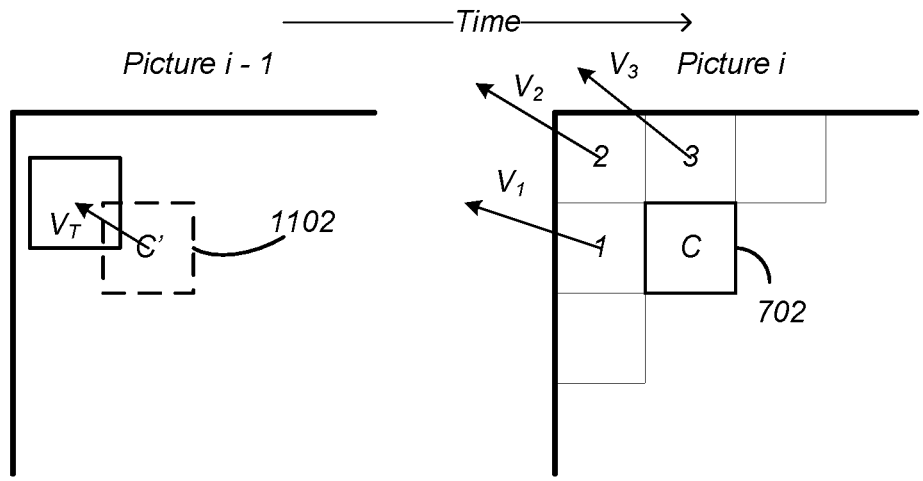
FIG. 12 is a diagram illustrating the use of motion vector predictors (MVPs)

FIG. 12 is a diagram illustrating the use of motion vector predictors (MVPs) in HEVC. Motion vector predictors $V_1$, $V_2$ and $V_3$ are taken from the MVs 1104 of a plurality of blocks 1, 2, and 3 situated nearby or adjacent the block to encode (C). As these vectors refer to motion vectors of spatially neighboring blocks within the same temporal frame and can be used to predict the motion vector of the block to encode, these vectors are known as spatial motion predictors.

FIG. 12 also illustrates temporal motion vector predictor $V_T$ which is the motion vector of the co-located block C' in a previously decoded picture (in decoding order) of the sequence (e.g. block of picture i-1 located at the same spatial position as the block being coded (block C of image i).

The components of the spatial motion vector predictors $V_1$, $V_2$ and $V_3$ and the temporal motion vector predictor $V_T$ can be used to generate a median motion vector predictor $V_M$. In HEVC, the three spatial motion vector predictors may be taken as shown in FIG. 12, that is, from the block situated to the left of the block to encode ($V_1$), the block situated above ($V_3$) and from one of the blocks situated at the respective corners of the block to encode ($V_2$), according to a predetermined rule of availability. This MV predictor selection technique is known as Advanced Motion Vector Prediction (AMVP).

A plurality of (typically five) MV predictor (MVP) candidates having spatial predictors (e.g. $V_1$, $V_2$ and $V_3$) and temporal predictor(s) $V_T$ is therefore obtained. In order to reduce the overhead of signaling the motion vector predictor in the bitstream, the set of motion vector predictors may reduced by eliminating data for duplicated motion vectors (for example, MVs which have the same value as other MVs may be eliminated from the candidates).

The encoder 202 may select a "best" motion vector predictor from among the candidates, and compute a motion vector predictor residual as a difference between the selected motion vector predictor and the actual motion vector, and transmit the motion vector predictor residual in the bitstream 314. To perform this operation, the actual motion vector must be stored for later use by the decoder 220 (although it is not transmitted in the bit stream 314. Signaling bits or flags are included in the bitstream 314 to specify which MV residual was computed from the normalized motion vector predictor, and are later used by the decoder to recover the motion vector. These bits or flags are further described below.

Referring back to FIG. 3, the intra-predicted residuals 1004 and the inter-predicted residuals 1106 obtained from the spatial (intra) or temporal (inter) prediction process are then transformed by transform module 308 into the transform units (TUs) 802 described above. A TU 802 can be further split into smaller TUs using the RQT decomposition described above with respect to FIG. 9. In HEVC, generally 2 or 3 levels of decompositions are used and authorized transform sizes are from 32×32, 16×16, 8×8 and 4×4. As described above, the transform is derived according to a discrete cosine transform (DCT) or discrete sine transform (DST).

The residual transformed coefficients are then quantized by quantizer 310. Quantization plays a very important role in data compression. In HEVC, quantization converts the high precision transform coefficients into a finite number of possible values. Although the quantization permits a great deal of compression, quantization is a lossy operation, and the loss by quantization cannot be recovered.

The coefficients of the quantized transformed residual are then coded by means of an entropy coder 312 and then inserted into the compressed bit stream 310 as a part of the useful data coding the images of the AV information. Coding syntax elements may also be coded using spatial dependencies between syntax elements to increase the coding efficiency. HEVC offers context-adaptive binary arithmetic coding (CABAC). Other forms or entropy or arithmetic coding may also be used.

In order to calculate the predictors used above, the encoder 202 decodes already encoded PUs 702 using "decoding" loop 315, which includes elements 316, 318, 320, 322, 328. This decoding loop 315 reconstructs the PUs and images from the quantized transformed residuals.

The quantized transform residual coefficients E are provided to dequantizer 316, which applies the inverse operation to that of quantizer 310 to produce dequantized transform coefficients of the residual PU (E') 708. The dequantized data 708 is then provided to inverse transformer 318 which applies the inverse of the transform applied by the transform module 308 to generate reconstructed residual coefficients of the PU (e') 710.

The reconstructed coefficients of the residual PU 710 are then added to the corresponding coefficients of the corresponding predicted PU (x') 702' selected from the intra-predicted PU 1004 and the inter-predicted PU 1106 by selector 306. For example, if the reconstructed residual comes from the "intra" coding process of the spatial predictor 324, the "intra" predictor (x') is added to this residual in order to recover a reconstructed PU (x") 712 corresponding to the original PU 702 modified by the losses resulting from a transformation, for example in this case the quantization operations. If the residual 710 comes from an "inter" coding process of the temporal predictor 330, the areas pointed to by the current motion vectors (these areas belong to the reference images stored in reference buffer 328 referred by the current image indices) are merged then added to this decoded residual. In this way the original PU 702 is modified by the losses resulting from the quantization operations.

To the extent that the encoder 202 uses motion vector prediction techniques analogous to the image prediction techniques described above, the motion vector may be stored using motion vector buffer 329 for use in temporally subsequent frames. As further described below, a flag may be set and transferred in the syntax to indicate that the motion vector for the currently decoded frame should be used for at least the subsequently coded frame instead of replacing the contents of the MV buffer 329 with the MV for the current frame.

A loop filter 322 is applied to the reconstructed signal (x") 712 in order to reduce the effects created by heavy quantization of the residuals obtained, and to improve the signal quality. The loop filter 322 may comprise, for example, a deblocking filter for smoothing borders between PUs to visually attenuate high frequencies created by the coding process and a linear filter that is applied after all of the PUs for an image have been decoded to minimize the sum of the square difference (SSD) with the original image. The linear filtering process is performed on a frame by frame basis and uses several pixels around the pixel to be filtered, and also uses spatial dependencies between pixels of the frame. The linear filter coefficients may be coded and transmitted in one header of the bitstream typically a picture or slice header.

The filtered images, also known as reconstructed images, are then stored as reference images from reference image buffer 328 in order to allow the subsequent "Inter" predictions taking place during the compression of the subsequent images of the current video sequence.

Reference Image Syntax

As described above, to reduce errors and improve compression, HEVC permits the use of several reference images for the estimation and motion compensation of the current image. Given a current PU 702 in a current picture, the collocated PU 1102 for a particular slice resides in associated nearby reference/non-reference picture. For example, in FIG. 12, the collocated PU 1102 for current PU 702 in picture (i) resides in the associated nearby reference picture (i-1). The best "inter" or temporal predictors of the current PU 702 are selected in some of the multiple reference/non-reference images, which may be based on pictures temporally prior to or after the current picture in display order (backwards and forward prediction, respectively).

For HEVC, the index to reference pictures is defined by reference picture lists that are described in the slice syntax. Forward prediction is defined by list_0 (RefPicList0), and backward prediction is defined by list_1 (RefPicList1), and both list 0 and list 1 can contain multiple reference pictures prior to or/and later than the current picture in the display order.

Figure 13:
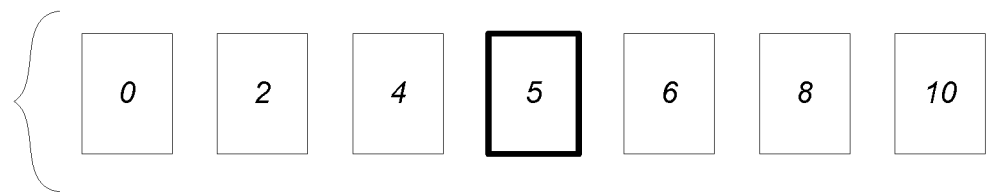
FIG. 13 illustrates an example of the use of the reference picture lists.

FIG. 13 illustrates an example of the use of the reference picture lists. Consider pictures 0, 2, 4, 5, 6, 8 and 10 shown in FIG. 13, wherein the numbers of each picture denote display order and the current picture is picture 5. In this case, the list 0 reference pictures with ascending reference picture indices and starting with index equal to zero are 4, 2, 0, 6, 8 and 10, and the list_1 reference pictures with ascending reference picture indices and starting with index equal to zero are 6, 8, 10, 4, 2, and 0. A slice that the motion compensated prediction is restricted to the list_0 prediction is called a predictive or P-slice. Collocated pictures are indicated by using the collocated_ref_idx index in the HEVC. A slice for which the motion-compensated prediction includes more than one reference picture is a bi-predictive or B-slice. For B-slices, the motion compensated prediction may include reference pictures from list_1 prediction as well as list_0.

Hence, a collocated PU 1102 is disposed in a reference picture specified in either list_0 or list_1. A flag (collocated_from_10_flag) is used to specify whether the collocated partition should be derived from list_0 or list_1 for a particular slice type. Each of the reference pictures is also associated with a motion vector.

The storage and retrieval of reference pictures and related motion vectors for the emerging HEVC standard is expressed in paragraph 8.4.1.2.9 of Benjamin Bross, Woo-Jin Han, Jens-Rainer Ohm, Gary J. Sullivan, Thomas Wiegand, "WD4: Working Draft 4 of High-Efficiency Video Coding," Joint Collaborative Team on Video Coding (JCT-VC) of ITU-T SG16 WP3 and ISO/IEC JTC1/SC29/WG11, JCTVC-F803_d5, 6th Meeting: Torino, IT, 14-22 Jul. 2011 (hereby incorporated by reference herein).

According to the standard, if the slice type is equal to B and the collocated_from_10_flag is 0, the collocated_ref_idx variable specifies the reference picture as the picture that contains the co-located partition as specified by RefPicList1. Otherwise (slice type is equal to B and collocated_from_10_flag is equal to 1 or slice type is equal to P), the collocated_ref_idx variable specifies the reference picture as the picture that contains the collocated partition as specified by RefPicList0.

Figure 14:
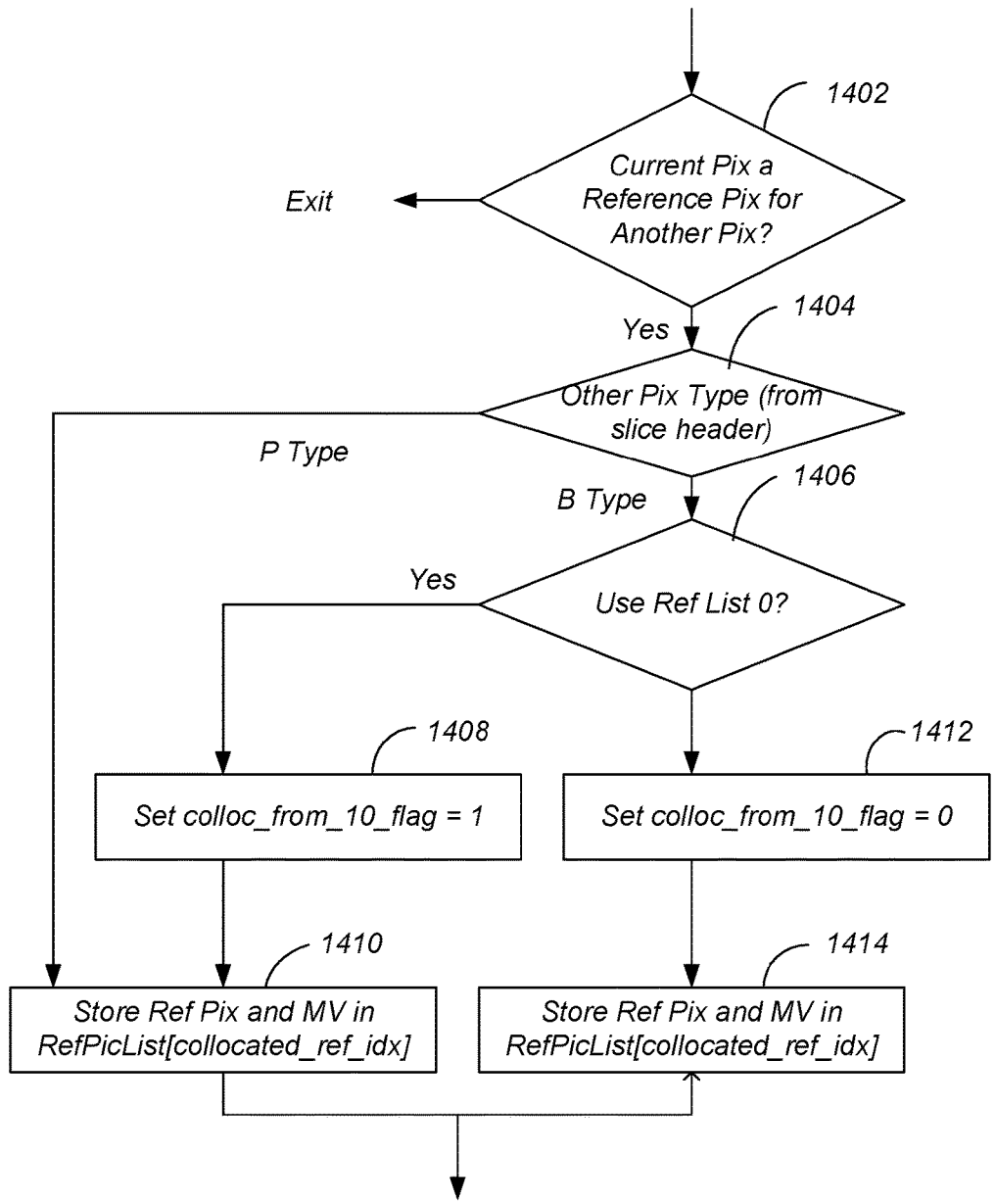
FIG. 14 is a diagram illustrating processes performed by the encoder according to the aforementioned standard.

FIG. 14 is a diagram illustrating processes performed by the encoder 202 according to the aforementioned standard. Block 1402 determines whether the current picture is a reference picture for another picture. If not, there is no need to store reference picture or motion vector information. If the current picture is a reference picture for another picture, block 1504 determines whether the "another" picture is a P-type or a B-type picture. If the picture is a P-type picture, processing is passed to blocks 1410, which set the colloc_from_10_flag to one and store the reference picture and motion vector in list_0. If the "another picture" is a B-type picture, block 1406 nonetheless directs processing to blocks 1408 and 1410 if the desired reference picture is to be stored in list_0, and to blocks 1412 and 1414 if the desired reference picture and motion vector is to be stored in list_1. This decision may be based on whether it is desirable to select reference pictures from a temporally preceding or succeeding picture. Which of the multiple possible reference pictures is selected is determined according to the collocated_ref_idx index.

Figure 15:
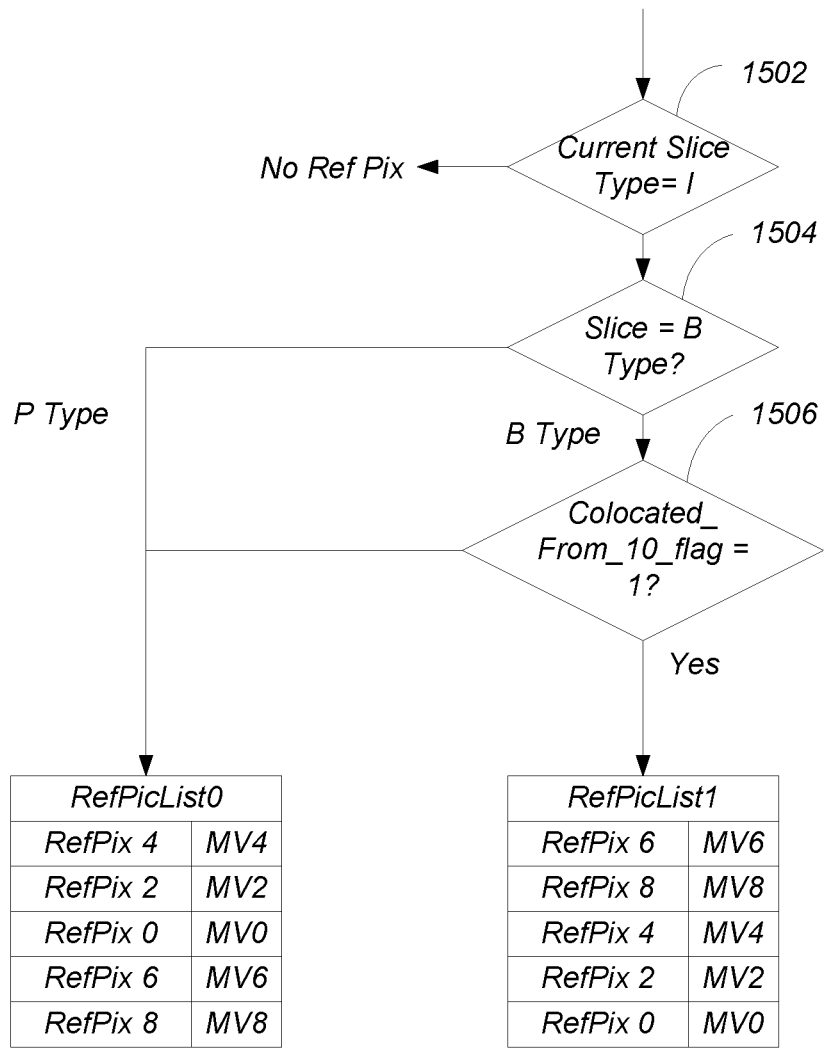
FIG. 15 depicts the use of a the collocated_from_10_flag by the decoder in decoding a according to the emerging HEVC standard.

FIG. 15 depicts the use of a collocated_from_10_flag by the decoder 220 in decoding a according to the previous HEVC standard. Block 1502 determines if the current slice type being computed is an intra or I-type. Such slices do not use temporally nearby slices in the encoding/decoding process, and hence there is no need to find a temporally nearby reference picture. If the slice type is not I-type, block 1504 determines whether the slice is a B-slice. If the slice is not a B-type, it is a P-type slice, and the reference picture that contains the collocated partition is found in list_0, according to the value of collocated_ref_idx. If the slice is B-type, the collocated_from_10_flag determines whether the reference picture is found in list_0 or list_1. As the index indicates, the collocated picture is therefore defined as the reference picture having the indicated collocated_ref_idx in either list_0 or list_1, depending on the slice type (B-type or P-type) and the value of the collocated_from_10_flag. In one embodiment of HEVC, the first reference picture (the reference picture having index [0] as shown in FIG. 13 is selected as the collocated picture).

Baseline Picture Parameter Set Syntax

Figure 16B:
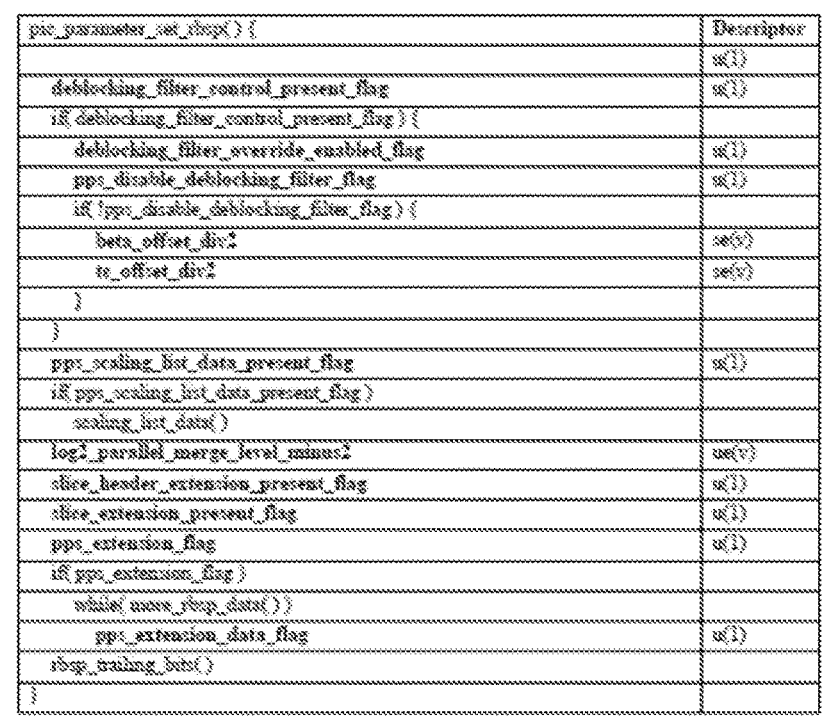

FIGS. 16A and 16B are diagrams presenting a baseline PPS Raw Byte Sequence Payload (RBSP) syntax. Syntax for dealing with extensions in the PPS are shown in FIG. 16B. Logic 1602 determines if the media is to be coded/decoded including a first extension and reads the appropriate signaling and data. Logic 1602 comprises statements 1606-1616. Statement 1606 reads a pps_extensional_flag, which indicates whether the first extension has been selected for the coding/decoding process. In one embodiment, a logical value of "1" indicates that the media is to be processed using the first extension, and a logical value of "0" indicates that the media is not to be processed using the first extension. Statement 1608 is a conditional statement that directs execution of statements 1612-1614 depending upon the value of a (previously read) transform_skip_enabled_flag. In particular, the illustrated logic performs the operations shown in statements 1612-1614 if the transform_skip_enabled_flag is a logical "1" or true.

Transform skipping is an extension that allows the DCT transform of a TU to be skipped under certain circumstances. Essentially, the DCT transform has the property that for media with highly correlated signals, it results in outstanding energy compaction. However, for media with highly uncorrelated signals (e.g. media having a large amount of detail), the compaction performance is much less. For some media, the DCT transform process has so little compaction performance, the process is better skipped for better processing performance. The transform_skip_enabled_flag indicates when skipping the DCT transform of a TU is permitted. This is described, for example, in "Early Termination of Transform Skip Mode for High Efficiency Video Coding," by Do Kyung Lee, Miso Park, Hyung-Do Kim and Je-Chang Jeong in the Proceedings of the 2014 International Conference on Communications, Signal Processing and Computers, which is hereby incorporated by reference. If the transform_skip_enabled_flag is a logical 1 (true), processing is routed to statement 1612 and 1614. Otherwise, processing is routed to statement 1618. Statement 1612 performs the operation of reading a value log 2_transform_skip_max_size_minus2, which indicates the maximum TU size that may be skipped (if the transform_skip_enabled_flag indicates that performing the DCT transform of the TU is permitted). Statement 1614 performs the operation of reading a flag pps_extension2_flag indicating if a further extension (extension2) is implemented.

Next, logic 1604 is performed. Logic 1604 includes statements 1618-1622. Statement 1618 is a conditional statement that routes processing to the logic of statements 1620 and 1622 if the pps_extension2_flag is a logical 1. Statements 1620 and 1622 read additional pps_extension_data_flags while RBSP data exists.

In the foregoing PPS design of HEVC range extension, the pps_extension2_flag accounts for as yet unidentified extension data. According to the logic described above, if pps_extension1_flag is true, pps_extension2_flag is present. If pps_extension1_flag is not true, pps_extension2_flag is not present. If pps_extension2_flag is not present, pps_extension2_flag is inferred to be equal to 0. If pps_extension2_flag is 0, there is no additional extension data.

This logical formulation always checks the value of pps_extension2_flag for possible additional extension syntax regardless of the status of pps_extension1_flag. However, if pps_extension1_flag is 0, there is no need to check pps_extension2_flag, because if pps_extension1_flag is 0, pps_extension2_flag will not be present, and if pps_extension2_flag is not present, it will inferred to be equal to 0, which indicates that there is no further extension data.

FIG. 16C presents a modified PPS Raw Byte Sequence Payload (RBSP) syntax. Logic 1602' is modified from logic 1602 and includes statements 1606-1622. As before, statement 1606 implements logic reading the pps_extension1_flag. Statement 1608 is a conditional statement that commands the processing of logic associated with statements 1610-1622 if the pps_extension1_flag is a logical 1 or true, and otherwise skips these statements.

Statement 1610 is a conditional statement that commands the operations of statements 1612-1614 be performed only if the transform_skip_enabled_flag (described above) is a logical 1. Those statements include, as before, a statement to read the value of the log 2_transform_skip_max_size_minus_2, and the pps_extension flag, as shown in statements 1612 and 1614. However, logic 1604 (statements 1616-1620) of FIG. 16B is now incorporated within the conditional statement 1608, and is executed only if pps_extension1_flag tests to a logical 1. This allows the logic of statements 1610-1620 to be skipped if pps_extension1_flag tests to a logical 0, thus saving execution time. While the foregoing is illustrated with respect to a second extension to read additional data that is only implicated if a first extension related to transform skipping tests true, the first extension and second extension may be any extensions that are non-independent (e.g. one of the extension functions or operations are only implicated depending on the status of another of the extension functions or operations.

FIG. 16D is a flow chart illustrating exemplary operations for decoding a sequence comprising a plurality of pictures that are processed at least in part according to a picture parameter set. In block 1630, a first extension flag (for example, the pps_extension1_flag) that signals a first extension function is to be performed in the processing of the sequence or the picture is read. In block 1632, a determination is made as to whether the read first flag has a first value, and if the flag does not have a first value, processing is routed around the logic of blocks 1634 and 1636. In the embodiment illustrated in FIG. 16C, this is analogous to logic of statement 1608 and 1622. Only if the read first flag has the first value, processing is passed to block 1634, which reads a second extension flag that signals a second extension function in the processing of the sequence or picture, and block 1636 performs the second extension function according to the read second extension flag. This is analogous to the logic of blocks 1614-1620.

In one embodiment, the first extension function is performed according to the first extension flag after reading the first extension flag and before reading the second extension flag. For example, with respect to FIG. 16C, the log 2_transform_skip_max_size_minus2 value is read if the pps_extension1_flag tests true before reading the pps_extension2_flag. IN this case, the processed picture comprises a plurality of TUs, and the processing sequence comprises DCT transforming at least some of the TUs of the associated processed picture, and skipping the DCT transforming process of other of the plurality of transform units under certain circumstances, for example, if the TU is greater in size than a maximum TU size (e.g. 4×4). In this case, the first extension function comprises reading a value indicating the maximum permitted size of the TU for which DCT transforming may be skipped.

As described above, the first extension function and the second extension function may be functionally related. For example, the second extension function may require receiving a result of the first extension function, before the second extension function may be completed. Or, the second extension function may be mutually exclusive from the first extension function (e.g. either the first extension function or the second extension function are to be performed, but not both). Or, the second extension function may be a function that would not be performed unless the first extension function is also performed, hence the second extension function is only implicated or performed in the processing sequence if the first extension function is also performed. For example, a computation may require an output or result from both the first extension function and the second extension function, and hence, existence of the first extension function necessarily implicates the second extension function and vice-versa.

The foregoing operations are described with respect to a decoding process, which can take place in either a the source decoder 220 or an encoder 202, as a part of the encoding process. The encoding process may also be expressed as comprising determining if a slice of the one or more slices is an inter-predicted slice according to slice type data, and if the slice is an inter-predicted slice, configuring a first parameter in the slice header associated with the slice to a value signaling enablement of a state of weighted prediction of image data associated with the slice.

Baseline Picture Parameter Set Syntax

FIGS. 16A and 16B are diagrams presenting a baseline PPS syntax. HEVC implements a technique known as weighted prediction, which is used to encode chroma and luma data used in slices subject to temporal encoding. As described, weighted prediction can consider one other reference slice (uni-weighted prediction) or two or more slices (bi-weighted prediction). As illustrated in FIG. 16A, the PPS syntax includes two flags related to weighted prediction operations: weighted_pred_flag 1602 and weighted_bipred_flag 1604. The weighted prediction flag 1602 specifies whether weighted prediction is to be applied to image data of P-slices. Setting the value to logical 1 indicates that weighed prediction is to be applied to image data in the P-slices in the picture, whereas setting the value to logical 0 indicates that weighted prediction is not to be applied to P-slices within the picture. Similarly, the weighted_bipred_flag 1604 is set to logical 0 to specify that the default weighted prediction is applied to B slices, and set to logical 1 specifies that weighted prediction is applied to B slices.

Baseline Slice Header Syntax

FIGS. 17A-17C are diagrams presenting a baseline slice header logic and syntax. In the diagrams, indentation of the text indicates the logical structure of the syntax, wherein the delimeter "||" represents a logical "OR," "&&" represents a logical "AND," "!" represents a logical inverse or complement. Further, if a logical condition statement (e.g. "if" statement is true, the operations indented from the logical if statement (and enclosed in brackets "{ }" are performed, otherwise processing continues to the next logical statement.

Turning first to FIG. 17A, slice processing syntax differs depending upon whether the slice segment is the first of a plurality of slices in a picture, of if it is not the first slice segment in the picture. Accordingly, the slice header comprises a first slice in picture flag (first_slice_segment_in_pic_flag) that is read. This is illustrated in syntax 1702. A test is made to determine if the picture does not require output of prior pictures by checking the value of nal_unit_type against BLA_W_LP. The variable nal_unit_type is defined in the NAL unit header semantics and specifies the type of raw byte sequence payload (RBSP) data structure contained in the NAL unit. The NAL unit type can take on a number of values, each indicating the content of the NAL unit and the RB SP syntax structure.

If the nal_unit_type is greater than BLA_W_LP, the no_output_of_prior_pics_flag is read, as shown in syntax 1703. The slice PPS identifier (slice_picture_parameter set id) is also read, as shown in syntax 1704.

As described earlier, the HEVC standard includes a plurality of NAL unit types that include a video parameter set (VPS), a sequence parameter set (SPS) which presents parameters for a sequence of pictures, and a picture parameter set (PPS) which describes parameters for a particular picture. An identifier of the slice picture parameter set (slice_pic_parameter set id) is also read. If the slice is not the first slice in the picture, the slice segment address and other information is read, a shown in syntax 1706.

Slice Header Syntax Reference Picture Related Processing

As described above, slices may include non-dependent slices or dependent slices, and the slice header syntax permits the disabling or enabling of the use of dependent slices altogether. The logic uses a previously read flag (dependent_slice_segments_enabled_flag) that signals that dependent slices are enabled and the first_slice_segment_in_ pic_flag to determine whether to read the dependent_slice_segment_flag. Note that if the slice is the first slice in the picture, the dependent slice flag for this slice is not read, as the slice cannot be a dependent slice under such circumstances. If the slice is a dependent slice, the logic that follows reads the slice type and other parameters that are used in later processing for all slice types (I, P, and B). Further processing shown in syntax 1712 is also performed.

Turning now to FIG. 17B, syntax 1715 includes a conditional statement testing whether the slice type data read earlier in the slice header indicates if the slice type is either P or B.

Reference Picture Index Processing:

If the slice type is a P or B, a flag (num_ref_idx_active_override_flag) is read as shown in syntax 1717. This flag indicates whether a parameter (num_ref_inx_l0_active_minus1) describing the maximum reference picture list index for list_0 (P-type) or another parameter (num_ref_idx_l1_active_minus1) describing the maximum reference picture list index for list_1 (B-type) are present in the slice header. If the (num_ref_idx_active_override_flag) tests positive, the num_ref_inx_l0_active_minus1 parameter is read, and if the slice is a B-type slice, the num_ref_inx_l1_active_minus1 parameter is also read, as shown in syntax 1718.

Reference Picture List Modification Processing

HEVC permits the baseline of the reference pictures to be modified in the encoding process. A previously read flag (lists_modification_present_flag) which, in one embodiment, may be read from the PPS) is compared to the value of NumPicTotalCurr. The NumPicTotal Curr variable is derived such that its value is the same as the pps_curr_pic_ref_enabled_flag if the current picture is a BLA or CRA picture, and otherwise, when the current picture contains a P or B slice, the value of NumPicTotalCurr shall not be equal to 0. Hence if the slice is a P or B slice, NumPicTotalCurr≠0 and is equal to the value of pps_curr_pic_ref_enabled_flag if the current picture is a PLA or a CRA picture. If the lists_modification_present_flag tests as a logic 1 and NumPicTotalCurr greater than one, reference list modifications (ref_pic_list_modification( )) syntax is executed, as shown in syntax 1719.

This information is used by the ref_pic_list_modification syntax to read, based on the slice type, a flag (reference_pic_list_modification_flag_l0) identifying whether the slice was encoded according to an implicit reference picture list (if the flag is a logical zero or not provided) or if the reference picture list for the reference picture list associated with the slice is to be explicitly defined (if the flag is logical 1), in which case list entries for the reference picture list are read. As described further below, the baseline ref_pic_list_modification( ) syntax includes logical conditional statements based on the slice-type, which are simplified in the solutions described below.

B-Slice Motion Vector Difference Signaling Processing:

Next, the slice header logic again determines whether the slice under consideration is a B-type slice, and if so, reads an mvd_l1_zero_flag. The mvd_l1_zero_flag is not applicable to P-type slices, and indicates whether the motion vector difference coding syntax structure used with B-type slices is parsed or not. This is shown in syntax 1720.

Entropy Coding Method Signaling Processing:

As described above with reference to the encoder 312 illustrated in FIG. 3, HEVC implements context adaptive coding such as context adaptive binary arithmetic coding, or CABAC. CABAC is a form of entropy encoding that encodes binary symbols using probability models. A non-binary valued symbol (such as a transform unit coefficient or motion vector) is binarized or converted into a binary code prior to arithmetic coding. Stages are repeated for each bit (or "bin") of the binarized symbol.

A context model is a probability model for one or more bins of the binarized symbol. This model may be chosen from a plurality of available models depending on the statistics of recently-coded data symbols. The context model stores the probability of each bin being "1" or "0". An arithmetic coder then encodes each bin according to the selected probability model.

A context variable is a variable specified for the adaptive binary arithmetic decoding process of a bin by an equation containing recently decoded bins. A cabac_init_flag specifies the method for determining the initialization table used in the initialization process for context variables. The value of cabac_init_flag is either 0 to 1, inclusive. When cabac_init_flag is not present, it is inferred to be 0.

Returning to FIG. 17B, the slice header logic checks a signaling flag (cabac_init_present_flag) indicating whether a context variable initialization flag (cabac_init_flag) is present in the slice header and should be read. If the signaling flag indicates that the context variable initialization flag is present in the slice header, the context variable initialization flag is read. The context variable initialization variable flag specifies the method for determining the initialization table used in the context variable initialization process. This is shown in syntax 1722.

Collocated Picture Location Index Read Processing:

Next, the slice header logic performs operations related to determining the location of the collocated picture used for temporal motion vector predictor. The slice header first checks if temporal motion vector predictor is enabled on a slice/picture level by checking the slice_temporal_mvp_enable_flag, as shown in syntax 1724. If the flag is not set, processing is directed to the weighted prediction discussed further below. If the flag is set, the slice header logic determines if the slice type is B, as shown in syntax 1730. If the slice type is B, the slice header logic reads the collocated_from_l0_flag, as shown in syntax 1732. The collocated_from_l0_flag equal to 1 specifies that the collocated picture used for temporal motion vector prediction is derived from reference picture list_0. The collocated_from_l0_flag equal to 0 specifies that the collocated picture used for temporal motion vector prediction is derived from reference picture list_1. When collocated_from_l0_flag is not present, it is inferred to be equal to 1. Next, the logic determines if the slice type is not I-type and either (1) the logical combination of the collocated_from_l0_flag and the num_ref_idx_l0_active_minus1 is greater than zero or (2) the logical combination of the inverse of the collocated_from_l0_flag and the num_ref_idx_active_minus1 is greater than zero). If either of these possibilities tests to a logical 1 (or True), the collocated reference index (collocated_ref_idx) is read, as shown in syntax 1734.

Weighted Prediction Read Processing:

HEVC and previous coding standards permitted a scaling and offset operation that is applied to prediction signals in a manner known as weighted prediction. Whereas H.264/MPEG-4 AVC supported both temporally-implicit and explicit weighted prediction, in HEVC, only explicit weighted prediction is applied, by scaling and offsetting the prediction with values sent explicitly by the encoder. The bit depth of the prediction is then adjusted to the original bit depth of the reference samples. In the case of uni-prediction, the interpolated (and possibly weighted) prediction value is rounded, right-shifted, and clipped to have the original bit depth. In the case of bi-prediction, the interpolated (and possibly weighted) prediction values from two PBs are added first, and then rounded, right-shifted and clipped.

In previous coding standards, up to three stages of rounding operations are required to obtain each prediction sample (for samples located at quarter-sample positions. Thus, if bi-prediction is used, the total number of rounding operations is then seven in the worst case. In HEVC, at most two rounding operations are needed to obtain each sample located at the quarter-sample positions, thus five rounding operations are sufficient in the worst case when bi-prediction is used. Moreover, in the most common case, where the bit depth B is 8 bits, the total number of rounding operations in the worst case is further reduced to three. Due to the lower number of rounding operations, the accumulated rounding error is decreased and greater flexibility is enabled in regard to the manner of performing the necessary operations in the decoder.

Returning to FIG. 17B, the slice header logic uses the slice type and the weighted prediction flags described above to determine if a table for weighted prediction is to be read and applied to the image data of the slice. As described above, the weighted_pred_flag is set equal to logical 0 to indicate that the weighted prediction is not applied to P slices, and set to logical 1 to indicate that weighted prediction is applied to P slices. The weighted_bipred_flag is set to logical 0 to specify that the default weighted prediction is applied to B slices, and set to logical 1 specifies that weighted prediction is applied to B slices. The slice header logic includes logic to read and apply the prediction weight table ((pred_weight_table( )) to slice image values if the weighted_pred_flag is set to a logical 1 and the slice type is P or if the weighted_bipred_flag is set to a logical 1 and the slice type is B, as shown in syntax 1736.

Motion Vector Maximum Candidate Signaling Processing;

A maximum number of motion vector prediction candidates that are supported in the slice can be specified. In the slice header logic, this specified such as the difference between the number "5" and the maximum number, and is referred to as five_minus_max_num_merge_cand. In the next slice header logic, if the slice type is a P type or a B type, the five_minus_max_num_merge_cand is read, as shown in syntax 1738. Since the maximum number of candidates is typically five, the number read is typically zero.

Integer Motion Vector Signaling Processing:

HEVC permits a choice between using motion vectors of integer or fractional values. The use_integer_mv_flag equal to 1 specifies that the resolution of motion vectors for inter prediction in the current slice is integer. Conversely, setting use_integer_mv_flag equal to 0 specifies that the resolution of motion vectors for inter prediction in the current slice is fractional with quarter-sample precision in units of luma samples.

Quantization Parameter Initialization Processing:

Without regard for the outcome of the syntax 1715 determining if the slice was is an inter-predicted (P or B type)slice, the slice header logic reads a variable (slice_qp_delta) describing the initial value for a quantization parameter to be used in coding blocks of data is read. This initial value is used until modified in the coding unit. This is illustrated by syntax 1740.

As described above, the loop filter 322 of the encoder/decoder may comprise, for example, a deblocking filter for smoothing borders between PUs to visually attenuate high frequencies created by the coding process and a linear filter that is applied after all of the PUs for an image have been decoded to minimize the sum of the square difference (SSD) with the original image. The linear filtering process is performed on a frame by frame basis and uses several pixels around the pixel to be filtered, and also uses spatial dependencies between pixels of the frame. The linear filter coefficients may be coded and transmitted in one header of the bitstream typically a picture or slice header.

Deblocking Filter Signaling Processing:

Turning to FIG. 17C, the slice header logic performs deblocking filter logic, as illustrated with respect to syntax 1742. This step is performed without regard for the outcome of the logic determining if the slice was is an inter-predicted (P or B type)slice as described in syntax 1715 above. First, the slice header logic determines whether a deblocking filter control is enabled by checking the status of a control flag (deblocking_filter_control_present_flag) in the picture parameter set (PPS). If the flag tests true, logic checks to determine if the deblocking filter is overridden by checking another flag (deblocking_filter_override_enabled_flag) which indicates that the slice header for pictures referring to the PPS have a deblocking_filter_override_flag. If this filter is enabled, a flag (deblocking_filter_override_flag) is read that indicates that the deblocking filter is to be overridden. Logic then determines whether the deblocking override filter is set, and if so, reads a slice header level flag (slice_header_disable_deblocking_filter_flag) (that indicates whether the deblocking filter should be disabled. If the slice_header_disable_deblocking_filter_flag is not set, then the slice header logic reads the beta_offset_div2 and tc_offset_div2 data, which specify default deblocking parameter offsets.

Finally, HEVC permits in-loop filtering operations to be performed across left and upper boundaries of the current slice. Previous editions of the HEVC slice header included a slice_loop_filter_across_slices_enabled_flag, that when set equal to 1 specifies that these in-loop filtering operations (include the deblocking filter and sample adaptive offset filter) are performed across the left and upper boundaries of the current slice; otherwise, the in-loop operations are not applied across left and upper boundaries of the current slice. The logic of syntax 1743 reads the slice_loop_filter_across_slices_enabled_flag if the feature is enabled on a sequence level (e.g. the loop_filter_across_slices_enabled_flag is set and any one of the indicated flags is set, as shown in syntax 1743. The remaining slice header syntax logic 1744 relates to the use of tiles or slice header extensions.

HEVC Picture Types

HEVC comprises a number of different picture types. Picture types are indicated in the NAL unit headers of the NAL units carrying the slices of the pictures. This permits the essential properties of the NAL unit payload to be available for applications at a high hierarchical level.

Figure 18:
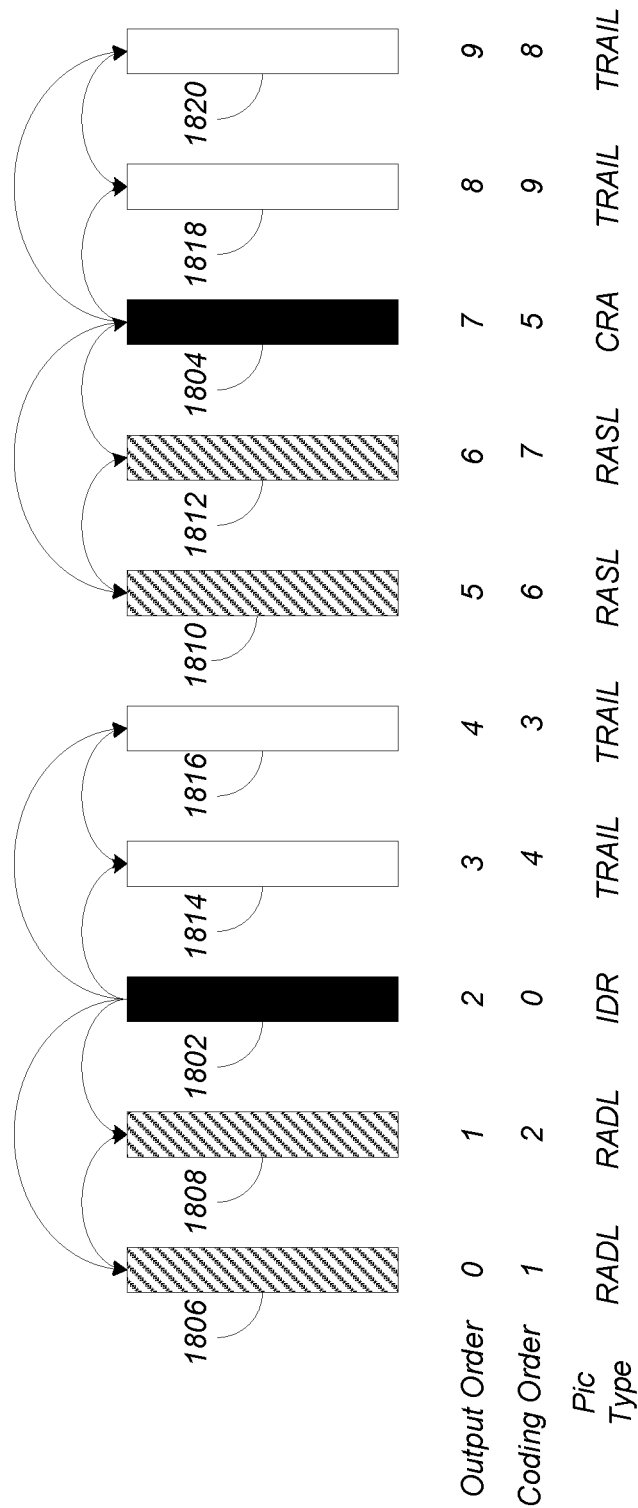
FIG. 18 is a diagram illustrating HEVC picture types and their relationships.

FIG. 18 is a diagram illustrating HEVC picture types and their relationships. These picture types include:

Random access point (RAP) pictures, where a decoder may start decoding a coded video sequence (CVS). These are referred to as Intra Random Access Pictures (TRAP). There are three TRAP picture types: Instantaneous decoder refresh (IDR) pictures 1802, clean random access (CRA) pictures 1804, and broken link access (BLA) pictures. The decoding process for a coded video sequence always starts on an IRAP.

Leading pictures, which lead TRAP pictures in output order, but are coded after the TRAP picture in the CVS. Leading pictures which are independent pictures preceding the TRAP picture in coding order are referred to as random access decodable leading pictures (RADL). Pictures 1806 and 1808 are examples of RADL pictures. Leading pictures which use pictures that precede the random access point in coding order for prediction might be corrupted if decoding starts at the corresponding TRAP. Accordingly, these pictures are skipped in the coding, and are referred to as random access skipped leading pictures (RASL). Examples of RASL pictures include pictures 1810 and 1812.

Trailing pictures, which follow the TRAP and the leading pictures in output and display order. Examples of trailing pictures include pictures 1814, 1816, 1818, and 1820.

Unification of Intra Block Copy and Inter Mode

As described above, the intraBC mode is a special "inter" mode in which a reconstructed block of the current picture is used as a reference for another block within the same picture.

Figure 19:
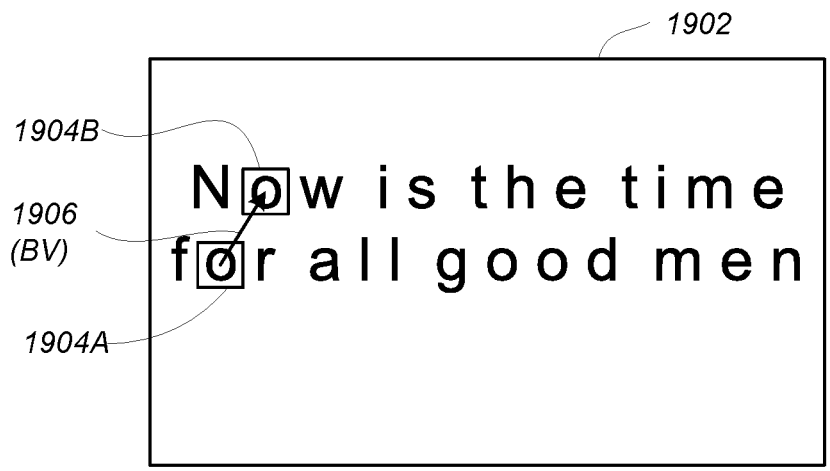
FIG. 19 is a diagram illustrating intra block copying.

FIG. 19. is a diagram illustrating intra block copying. A frame 1902 may comprise a plurality of blocks. Blocks 1904A and 1904B comprise identical or nearly identical information. Since they comprise identical information, coding efficiency may be effected by signaling the contents of block 1904A (which depicts the letter "o") to be the same or different only in residuals as block 1904B (which also depicts the letter "o"). This may be accomplished using signaling analogous to the motion vector signaling described above for inter frame coding by coding the reference block 1904B for the current block 1904A and the block vector (BV) 1906 describing the spatial relationship between the current block 1904A and reference block 1904B.

IntraBC can be applied to PU 2N×N, N×2N, and N×N as well as 2N×2N. However, N×N intraBC is only allowed when the current CU is a smallest CU.

New methods for predicting and coding intraBC BVs have been proposed, as opposed to the methods for predicting and coding motion vectors in earlier versions of HEVC. In one BV prediction scheme, one candidate from the left and one from the top neighbors of the current block are used as the two primary predictors for BV prediction. In the case when spatial neighbors are not available (e.g. neighboring blocks are coded in regular intra or inter mode instead of the intraBC mode, or hit the picture or slice boundaries) two last coded BVs are used to fill the candidate list. At the beginning of each coding tree unit (CTU), these two so-called last coded BVs are initialized using constant values. A 1-bit flag is used to signal one of the two candidates that is used to predict the current BV.

Intra Block Coding Signaling

Pictures which enable the intraBC mode are signaled via a curr_pic_as_ref_enabled_flag of the sequence parameter set (SPS) screen content coding extension. Specifically, in the SPS:

curr_pic_as_ref_enabled_flag equal to 1 specifies that a particular picture referring to the SPS may be included in a reference picture list of the particular picture itself (e.g. the current picture may be a picture invoking the intraBC mode).

curr_pic_as_ref_enabled_flag equal to 0 specifies that a particular picture referring to the SPS is never included in any reference picture list of the particular picture itself (e.g. the current picture will never be a picture invoking the intraBC mode).

When not present, the value of curr_pic_as_ref_enabled_flag is inferred to be equal to 0. When curr_pic_as_ref_enabled_flag is equal to 1, I slices may still be permitted in the coded video sequences (CVSs) referring to the SPS.

HEVC signaling may be modified to account for intraBC modes by taking advantage of the logic used for accessing pictures within coded video sequences. Such logic defines the following picture sub-types:

Broken Link Access (BLA) Picture:

A BLA picture is an TRAP picture for which each VCL NAL unit has nal_unit_type equal to BLA_W_LP, BLA_W_RADL, or BLA_N_LP. A BLA picture does not refer to any other picture for its coding, and may be the first picture in the bitstream in decoding order, or may appear later in the bitstream. Each BLA picture begins a new CVS, and has the same effect on the decoding process as the instantaneous decoder refresh (IDR) picture discussed above. However, a BLA picture contains syntax elements that specify a non-empty reference picture set (RPS).

When a BLA picture for which each VCL NAL unit has nal_unit_type equal to BLA_W_LP, it may have associated RASL pictures, which are not output by the decoder 258 and may not be decodable, as they may contain references to pictures that are not present in the bitstream. A BLA picture for which each VCL NAL unit has nal_unit_type equal to BLA_W_LP may also have associated RADL pictures, which are specified to be decoded. When a BLA picture for which each VCL NAL unit has nal_unit_type equal to BLA_W_RADL, it does not have associated RASL pictures but may have associated RADL pictures. Finally, when a BLA picture for which each VCL NAL unit has nal_unit_type equal to BLA_N_LP, it does not have any associated leading pictures.

Hence, there are three BLA network abstraction layer (NAL) unit types. BLA_N_LP, for which leading pictures are forbidden. BLA_W_RADL, for which RASL pictures are forbidden, but RADS pictures may be present, and BLA_W_LP, for which both RASL and RADL pictures are allowed.

Clean Random Access (CRA) Picture:

An IRAP picture for which each VCL NAL unit has nal_unit_type equal to CRA_NUT. A CRA picture does not refer to any other picture for its coding, and may be the first picture in the bitstream in decoding order, or may appear later in the bitstream. A CRA picture may have associated RADL or RASL pictures. CRA pictures are similar to BLA pictures, as a CRA picture may contain syntax elements that specify a non-empty RPS. When a CRA picture has NoRaslOutputFlag equal to 1, the associated RASL pictures are not output by the decoder, because they may not be decodable, as they may contain references to pictures that are not present in the bitstream.

Instantaneous Decoding Refresh (IDR) Picture:

An IRAP picture for which each VCL NAL unit has nal_unit_type equal to IDR_W_RADL or IDR_N_LP. An IDR picture does not refer to any other picture for its coding, and may be the first picture in the bitstream in decoding order, or may appear later in the bitstream. Each IDR picture is the first picture of a CVS in decoding order. When an IDR picture for which each VCL NAL unit has nal_unit_type equal to IDR_W_RADL, it may have associated RADL pictures. When an IDR picture for which each VCL NAL unit has nal_unit_type equal to IDR_N_LP, it does not have any associated leading pictures. An IDR picture does not have associated RASL pictures.

Intra Random Access Point (TRAP) Picture:

A coded picture for which each VCL NAL unit has nal_unit_type in the range of BLA_W_LP to RSV_I-RAP_VCL23, inclusive. As described above, an TRAP picture does not refer to any other picture for its coding, and may be a BLA picture, a CRA picture or an IDR picture. The first picture in the bitstream in decoding order must be an TRAP picture. Provided the necessary parameter sets are available when they need to be activated, the IRAP picture and all subsequent non-RASL pictures in decoding order can be correctly decoded without performing the decoding process of any pictures that precede the TRAP picture in decoding order. There may be pictures in a bitstream that do not refer to any other picture for their coding that are not IRAP pictures.

Unification of Intra Block Copy and Inter Signaling Related Syntax and Semantics Since the self-picture referring is a picture level behavior, it is not necessary to force all pictures in a sequence to have the same functionality. If the curr_pic_as_ref_enabled_flag is enabled at sequence level, it means all the B and P slices have to always add the picture itself to the reference picture list, which may increase the complexity without any benefits. Therefore, it makes sense to move the curr_pic_as_ref_enabled_flag from SPS to PPS for a more flexible signaling. This can be accomplished, for example, by removing the curr_pic_as_ref_enabled_flag from the sequence parameter set (sps_scc_extensions( )) and including the curr_pic_as_ref_enabled_flag in the picture parameter set scc extensions syntax (pps_scc_extensions( ).

In this implementation, curr_pic_as_ref_enabled_flag equal to 1 specifies that a particular picture referring to the PPS may be included in a reference picture list of the particular picture itself. When the curr_pic_as_ref_enabled_flag equal to 0 specifies that a particular picture referring to the PPS is never included in any reference picture list of the particular picture itself. When not present, the value of curr_pic_as_ref_enabled_flag is inferred to be equal to 0. Note that when curr_pic_as_ref_enabled_flag is equal to 1, I slices may still be permitted in the CVSs referring to the PPS.

Regardless where the curr_pic_as_ref_enabled_flag is signalled (either in SPS or PPS) we can make modifications below to further improve the coding performance.

Figure 20:
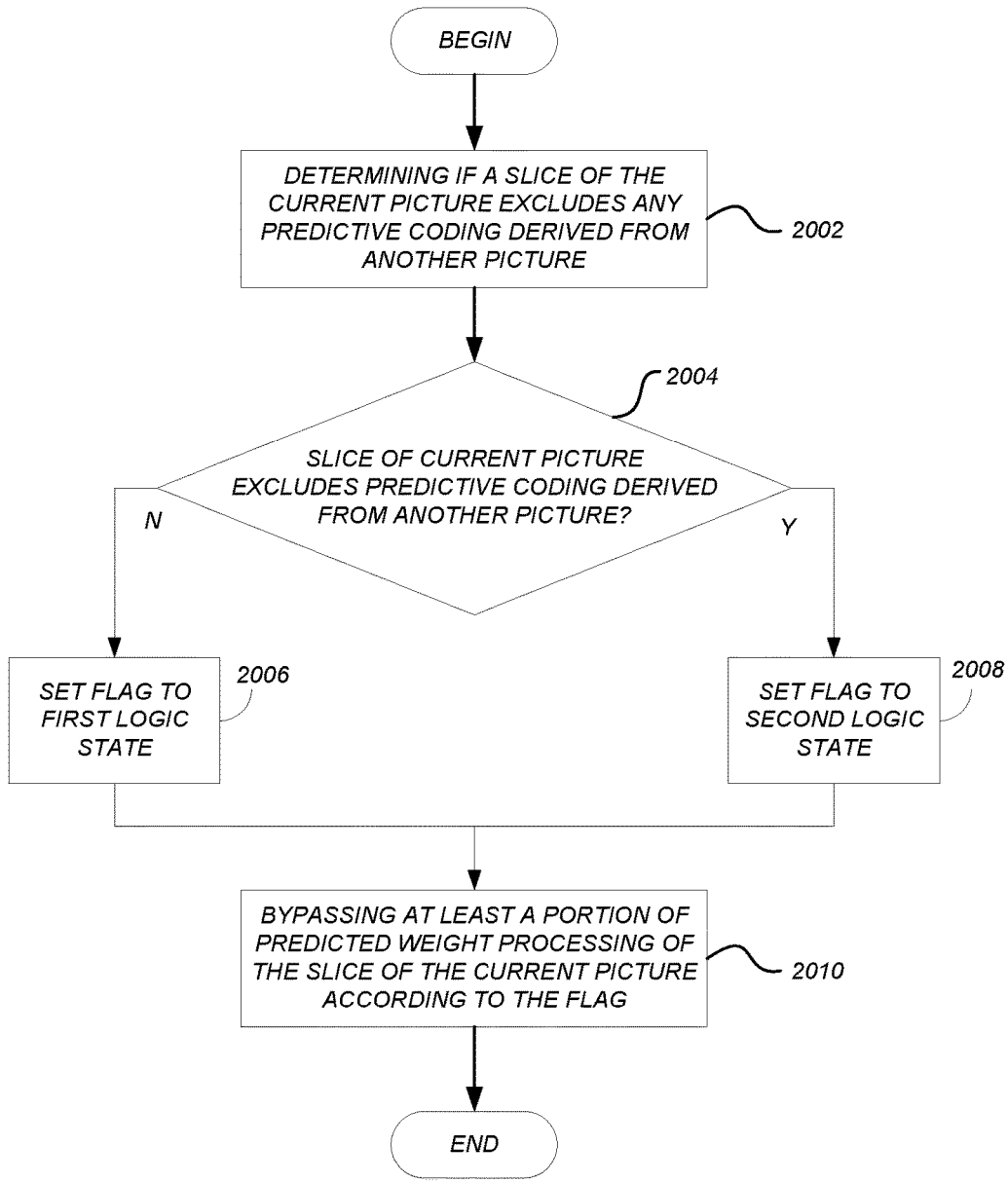
FIG. 20 is a diagram illustrating operations that can be performed to simplify the unified block copy and intra signaling and syntax.

FIG. 20 is a diagram illustrating operations that can be performed to simplify the unified block copy and intra signaling and syntax. In block 2002, a determination is made as to whether a slice of the current picture excludes any predictive coding derived from another picture. Such pictures may include an I picture (which does not use other pictures in a predictive coding process), and either B or P pictures that are coded to perform an intra block copy operation. B and P pictures ordinarily do use other pictures in a predictive coding process, but when the intra block copy operation is used for a specific block, such blocks no longer refer to any other picture, but rather a different portion of the same picture, as described above in FIG. 19.

One technique for determining whether the slice of the current picture excludes any predictive coding derived from another picture is to determine if the slice of the current picture is a P-type or B-type slice and also has at least one reference picture that is the current reference itself. If the picture has only one reference picture, and that one reference picture is the current picture itself, it can be determined that the picture excludes any predictive coding derived from another picture. If the picture has multiple reference pictures (one of which is itself), whether that picture exclude any predictive coding derived from another picture depends on whether that reference picture is actually chosen for processing the block under consideration. That is because each block within the same current picture may have a number of reference pictures. For example, consider a picture that has five reference pictures, one of such reference pictures is the current picture itself. A first block of the picture (e.g. Block 0) may be signaled to be processed using the first reference picture. Similarly, a second block of the picture (Block 1) may be signaled to use the third reference picture. But a third block of the picture (Block 2) may be signaled to use the current picture as a reference picture (e.g. using intra block copying). In this case, Block 0 and Block 1 are regular pictures that use predictive coding derived from another picture, but Block 2 is signaled to use predictive coding from the same picture (e.g. intra block copying) and thus excludes predictive coding from another picture.

If curr_pic_as_ref_enabled_flag is 1, it means that the current picture may be included in a reference picture list as one of the reference pictures. At the same time, when curr_pic_as_ref_enabled_flag is 1, the slice of current picture will be an inter slice (P-type or B-type) instead of an intra slice. Therefore, when curr_pic_as_ref_enabled_flag is 1, the current picture is a P-type or a B-type slice and includes at least one reference picture that is the current picture.

Further, if the current picture is also an IRAP picture, the slice type within this IRAP will therefore be a special instance of either P-type or B-type. However, this P-type or B-type slice within an IRAP is different than an ordinary P or B slice because it does not refer to any other picture for its coding.

With this understanding, we define two variables, IsIRAP, IsSCCIRAP, as follows.

IsIRAP=(nal_unit_type>=BLA_W_LP && nal_unit_type<=RSV_IRAP_VCL23) ? 1:0 and

IsSCCIRAP=(curr_pic_as_ref_enabled_flag && IsIRAP) ? 1:0

According to the first above definitions, IsIRAP is 1 if the nal_unit_type is greater than or equal to BLA_W_LP (as described above) and the nal_unit_type is less than RSV_I-RAP_VCL23, otherwise IsIRAP is 0. The included values for nal_unit_type includes the NAL unit types shown in Table I.:

TABLE I

NAL Unit Type Values

| nal_unit_type | name of nal_unit_type | Content of NAL unit and RBSP syntax structure |
| --- | --- | --- |
| 16 | BLA_W_LP | Coded slice segment of a BLA picture |
| 17 | BLA_W_RADL | |
| 18 | BLA_N_LP | slice_segment_layer_rbsp( ) |
| 19 | IDR_W_RADL | Coded slice segment of an IDR picture |
| 20 | IDR_N_LP | slice_segment_layer_rbsp( ) |
| 21 | CRA_NUT | Coded slice segment of a CRA |

TABLE I-continued

NAL Unit Type Values

| nal_unit_type | name of nal_unit_type | Content of NAL unit and RBSP syntax structure |
|---|---|---|
| 22 | RSV_IRAP_VCL22 | picture slice_segment_layer_rbsp( ) Reserved IRAP VCL NAL unit types |
| 23 | RSV_IRAP_VCL23 | |

According to the second definition, if IsSCCIRAP is 1, it means that this picture is an IRAP picture, moreover, this TRAP picture allows the current picture as its reference picture. Under such circumstances, a slice of this picture must exclude any predictive coding derived from another picture. This is true because an TRAP pictures are intra pictures (which do not include predictive coding derived from another picture) and B or P pictures which are intra block copy pictures (which also do not include predictive coding derived from another picture). The IsSCCIRAP value can be used as a flag to bypass processing that would otherwise be performed on slices of pictures that use predictive coding derived from another picture (e.g. ordinary B or P pictures).

Figure 21:
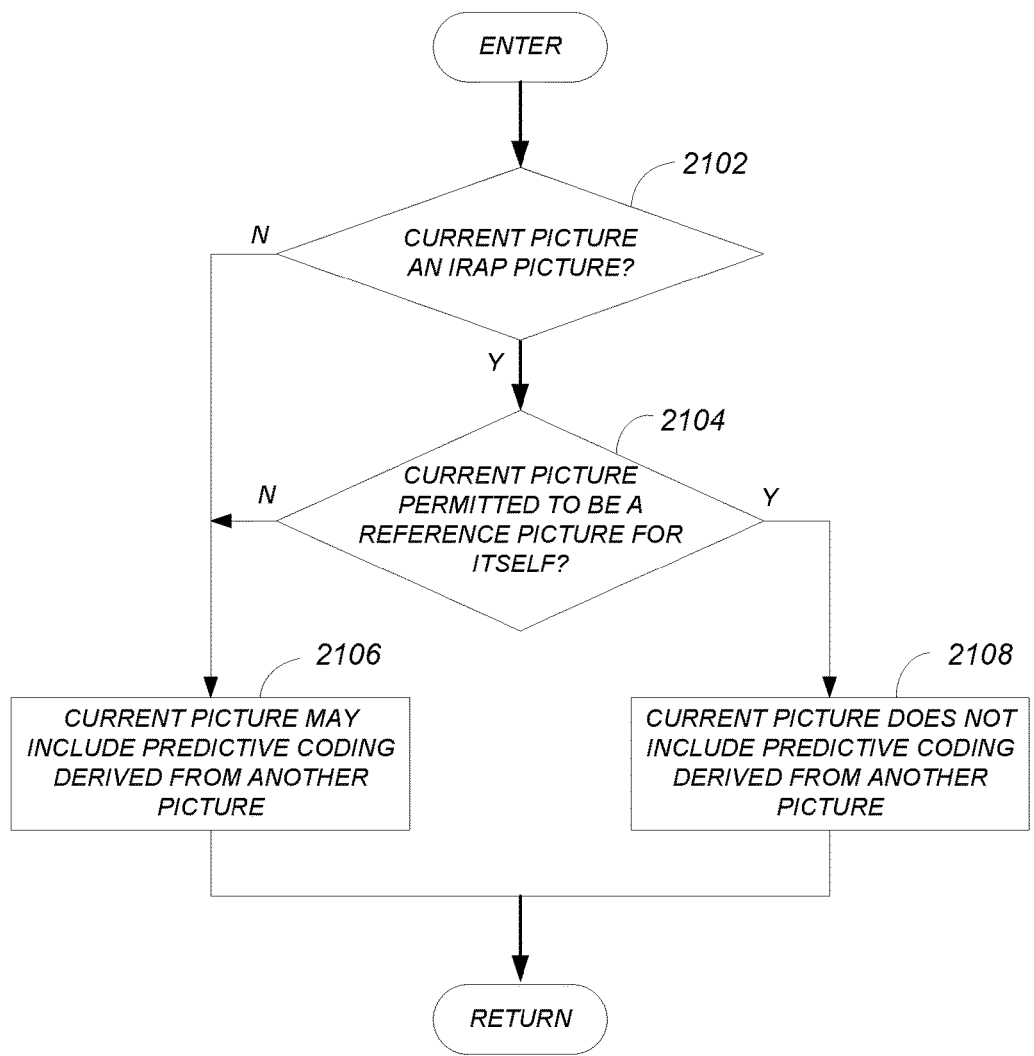
FIG. 21 is a diagram illustrating how a slice of a current picture may be determined to exclude predictive coding derived from another picture.

FIG. 21 is a diagram illustrating how a slice of a current picture may be determined to exclude predictive coding derived from another picture. In block 2102, it is determined if the current picture is an TRAP picture. In one embodiment, this may be accomplished as described above, e.g. by determining if the nal_unit_type has a value in the range of BLA_W_LP to RSV_VCL inclusive, and if nal_unit_type has a value in that range, determining that the picture is an TRAP picture. If the current picture is an IRAP picture processing continues to block 2104, which determines if the current picture is permitted to be a reference picture of itself. This can be determined for example, by the curr_pic_as_ref_enabled_flag described above. If this tests true, it is determined that the picture does not include predictive coding derived from another picture. If either block 2102 or 2104 test false, the slice of the current picture may or may not include predictive coding derived from another picture, as shown in block 2106.

Different techniques may be employed for bypassing processing that is no longer required because the slice of the current picture does not include predictive coding derived from another picture. Each of these techniques bypasses predicted weight processing, but the different techniques also bypass other processing.

First Embodiment

Recalling the slice header syntax presented in FIG. 17B, a test is made to determine if the slice is a P slice or a B slice, as shown in syntax 1715. If the current slice is either a P or a B slice the syntax of blocks 1717-1739 is executed. Otherwise, the syntax of blocks 1717-1739 is not parsed or performed. As described above, this syntax includes syntax for performing the functions shown in Table II:

TABLE II

Slice Header Syntax Functions

| Syntax | Syntax Function |
|---|---|
| 1717-1718 | reference picture index signaling processing |
| 1719 | reference picture list modification signaling |

TABLE II-continued

Slice Header Syntax Functions

| Syntax | Syntax Function |
|---|---|
| 1720 | B-slice motion vector difference signaling |
| 1722 | entropy coding method signaling processing |
| 1724-1734 | collocated reference picture signaling |
| 1736 | weighted prediction signaling processing |
| 1738 | motion vector maximum candidate signaling processing |
| 1740 | integer motion vector signaling processing |

If IsSCCIRAP is 1, the reference picture which is used for all inter mode of the slice of the current picture must be the current picture itself. Therefore, the parsing of all inter slice (P and B slices) related syntax may be bypassed.

FIG. 22 is a diagram illustrating an examplary modification of the slice segment header syntax. In this exemplary modification, the the logical statement syntax that determines if the slice is a P slice or a B slice before routing processing to parse the syntax of a items 1717-1739 is modified using the precomputed value for IsSCCIRAP defined above. Specifically, logical statement 2202 bypasses processing items 1717-1739 if (1) the slice is neither a P slice or a B slice and (2) the value of IsSCCIRAp is not 1. Therefore if IsSCCIRAP has a value of 1 (indicating that the reference picture which is used for all inter mode of the slice of the current picture must be the current picture itself), the parsing of sytax of items 1717-1739 is bypassed.

Second Embodiment

If IsSCCIRAP is 1, the reference picture which is used for all inter mode of the slice of the current picture must be the current picture itself. However, some syntax elements, such as five_minus_max_num_merge_cand and reference list modification related processing, may be still parsed when IsSCCIRAP is 1.

Figure 23:
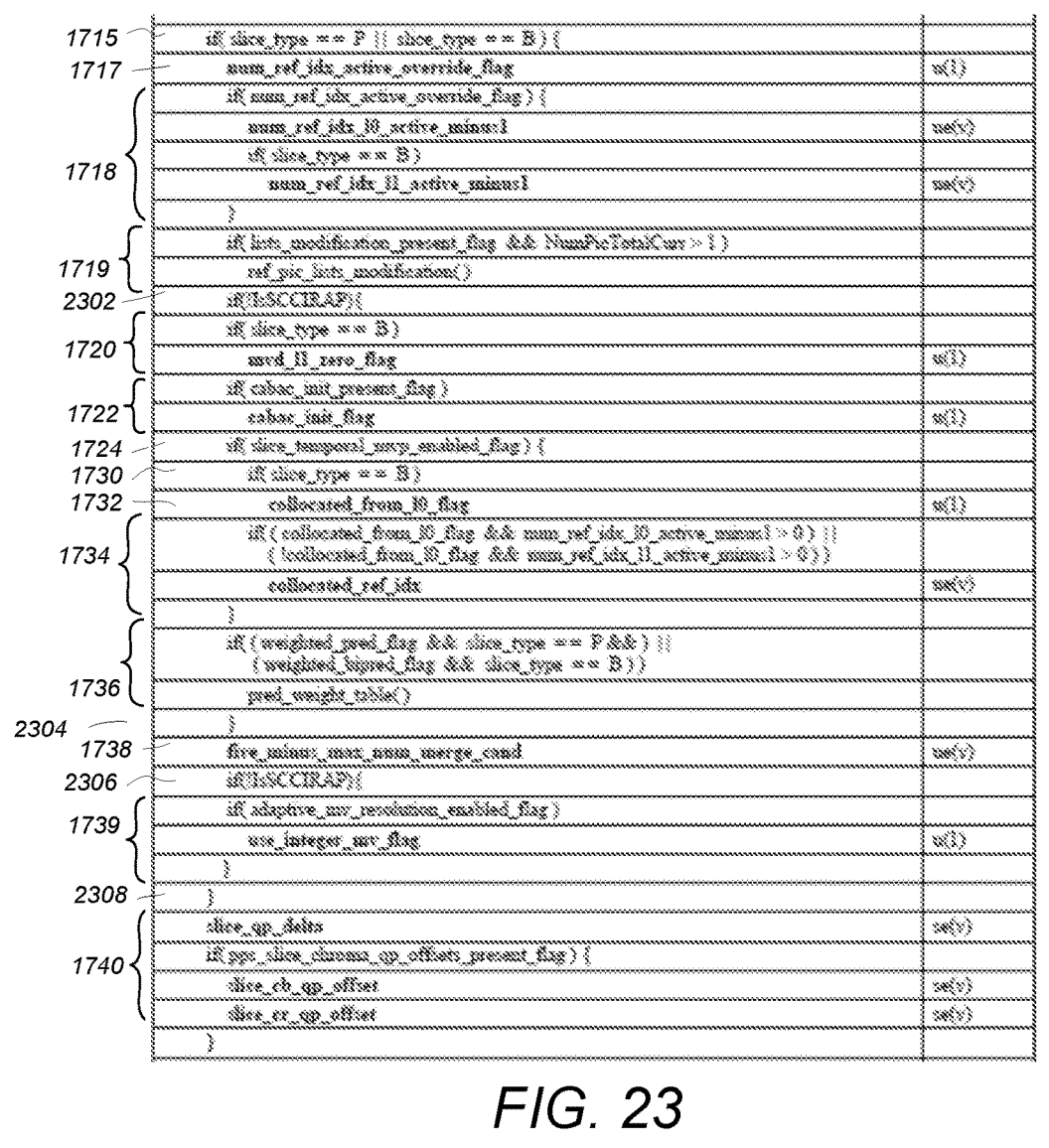

FIG. 23 is a diagram illustrating an examplary modification of the slice segment header syntax for this second embodiment. In the second embodiment, syntax 1715 still routes processing to syntax 1717-1719 (reference picture index signaling and reference picture list modification signaling), but thereafter, inserted syntax 2302 checks the status of IsCCIRAP. If IsSCCIRAP is 1, the processing of syntax 1720-1734 until close loop 2304 (e.g. B-slice motion vector difference signaling, entropy coding method signaling processing, and collocated reference picture signaling, and weighted prediction signaling processing) is bypassed. The motion vector candidate signaling processing of sytnax 1738 (e.g. reading the five_minus_max_num_merge_cmd value) is still parsed. Further, inserted syntax 2306 again checks the status of IsSCCIRAP. If IsSCCIRAP is one, syntax up to 2308 (e.g. the integer motion vector signaling processing of syntax 1739) is bypassed.

Third Embodiment

The second embodiment inserts two conditional statements to bypass the parsing of unneeded syntax. Analogous functionality can be obtained by using only one conditional statement and moving the motion vector maximum candidate signaling of syntax 1738. This saves the parsing of more than one conditional statement.

FIG. 24 is a diagram illustrating an examplary modification of the slice segment header syntax for this second embodiment. In this embodiment, syntax 1715 still routes processing to syntax 1717-1719 (reference picture index signaling and reference picture list modification signaling), but thereafter, inserted syntax 2402 checks the status of IsCCIRAP. If IsSCCIRAP is 1, the processing of syntax 1720-1739 until close loop 2404 (e.g. B-slice motion vector difference signaling, entropy coding method signaling processing, and collocated reference picture signaling, weighted prediction signaling processing, and integer motion vector signaling processing) is bypassed. The motion vector candidate signaling processing of sytnax 1738 (e.g. reading the five_minus_max_num_merge_cmd value) is illustrated to be removed from the loop and relocated outside of the processing loop defined by syntax 2402 and 2404 to syntax location 2406. Hence, the motion vector candidate signaling processing of syntax 1738 is still performed.

Hardware Environment

Figure 25:
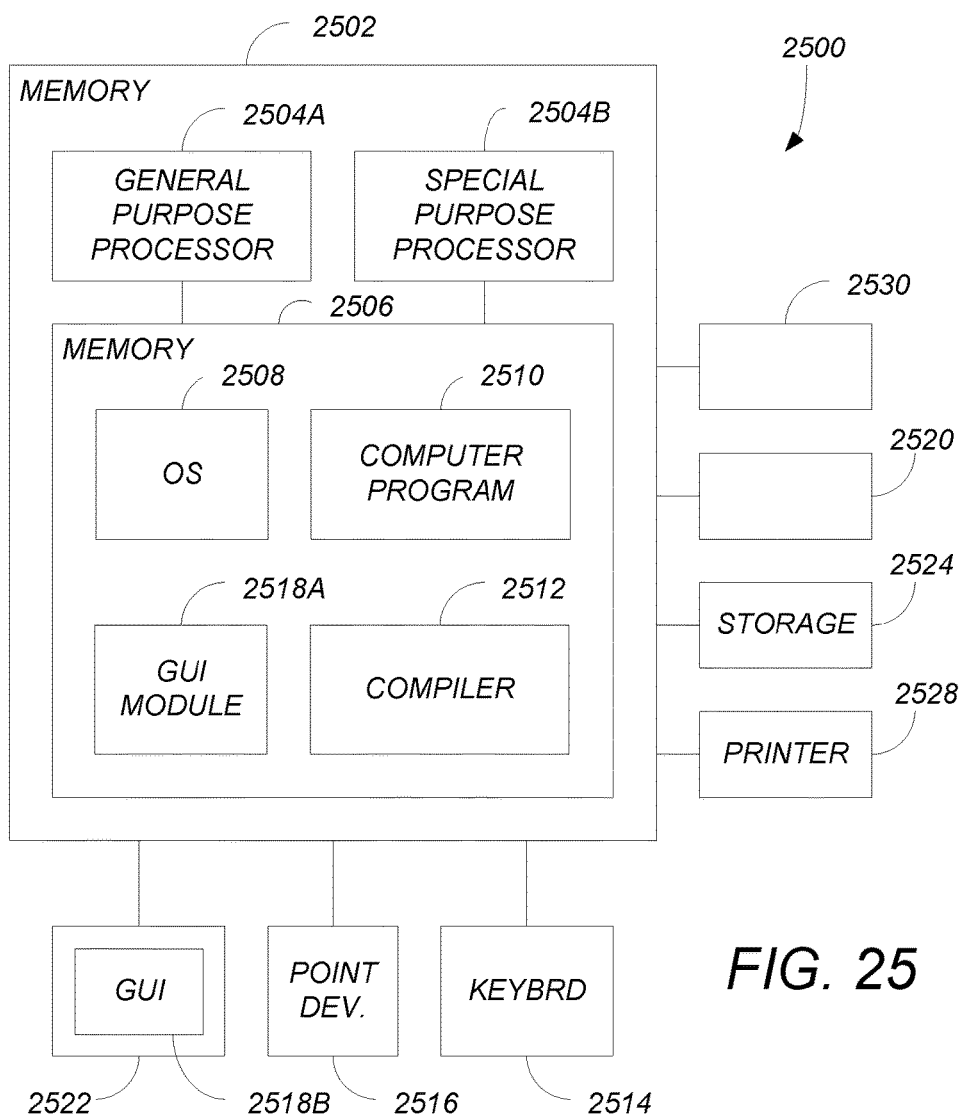
FIG. 25 illustrates an exemplary processing system that could be used to implement the embodiments of the invention.

FIG. 25 illustrates an exemplary processing system 2500 that could be used to implement the embodiments of the invention. The computer 2502 comprises a processor 2504 and a memory, such as random access memory (RAM) 2506. The computer 2502 is operatively coupled to a display 2522, which presents images such as windows to the user on a graphical user interface 2518B. The computer 2502 may be coupled to other devices, such as a keyboard 2514, a mouse device 2516, a printer 2528, etc. Of course, those skilled in the art will recognize that any combination of the above components, or any number of different components, peripherals, and other devices, may be used with the computer 2502.

Generally, the computer 2502 operates under control of an operating system 2508 stored in the memory 2506, and interfaces with the user to accept inputs and commands and to present results through a graphical user interface (GUI) module 2518A. Although the GUI module 2518A is depicted as a separate module, the instructions performing the GUI functions can be resident or distributed in the operating system 2508, the computer program 2510, or implemented with special purpose memory and processors. The computer 2502 also implements a compiler 2512 which allows an application program 2510 written in a programming language such as COBOL, C++, FORTRAN, or other language to be translated into processor 2504 readable code. After completion, the application 2510 accesses and manipulates data stored in the memory 2506 of the computer 2502 using the relationships and logic that was generated using the compiler 2512. The computer 2502 also optionally comprises an external communication device such as a modem, satellite link, Ethernet card, or other device for communicating with other computers.

In one embodiment, instructions implementing the operating system 2508, the computer program 2510, and the compiler 2512 are tangibly embodied in a computer-readable medium, e.g., data storage device 2520, which could include one or more fixed or removable data storage devices, such as a zip drive, floppy disc drive 2524, hard drive, CD-ROM drive, tape drive, etc. Further, the operating system 2508 and the computer program 2510 are comprised of instructions which, when read and executed by the computer 2502, causes the computer 2502 to perform the steps necessary to implement and/or use the invention. Computer program 2510 and/or operating instructions may also be tangibly embodied in memory 2506 and/or data communications devices 2530, thereby making a computer program product or article of manufacture. As such, the terms "article of manufacture," "program storage device" and "computer program product" as used herein are intended to encompass a computer program accessible from any computer readable device or media.

The processing system 2500 may also be embodied in a desktop, laptop, tablet, notebook computer, personal data assistant (PDA), cellphone, smartphone, or any device with suitable processing and memory capability. Further, the processing system 2500 may utilize special purpose hardware to perform some or all of the foregoing functionality. For example the encoding and decoding processes described above may be performed by a special purpose processor and associated memory.

Those skilled in the art will recognize many modifications may be made to this configuration without departing from the scope of the present disclosure. For example, those skilled in the art will recognize that any combination of the above components, or any number of different components, peripherals, and other devices, may be used. For example, particular functions described herein can be performed by hardware modules, or a processor executing instructions stored in the form of software or firmware. Further, the functionality described herein can be combined in single modules or expanded to be performed in multiple modules.

CONCLUSION

The foregoing description of the preferred embodiment has been presented for the purposes of illustration and description. It is not intended to be exhaustive or to limit the disclosure to the precise form disclosed. Many modifications and variations are possible in light of the above teaching. It is intended that the scope of rights be limited not by this detailed description, but rather by the claims appended hereto.

What is claimed is:

1. In a processing device for processing a video sequence having a plurality of pictures, each picture having a plurality of slices, a method of processing a slice of a current picture, comprising:
   determining when a slice of the current picture excludes any predictive coding derived from another picture;
   when the slice of the current picture is designated to exclude any predictive coding derived from another picture, setting a flag to a first logic state;
   when the slice of the current picture is not designated to exclude any predictive coding derived from another picture, setting the flag to a second logic state; and
   bypassing at least a portion of predicted weight processing of inter picture processing of the slice of the current picture according to the logic state of the flag when coding if the flag is in the first logic state,
   wherein the slice of the current picture is of one of an intra coding type (I-slice), a predictive coding type (P-slice) and bi-predictive coding type (B-slice),
   wherein the processing of the slice is performed according to a slice a header having inter picture processing,
   wherein bypassing at least a portion of the predicted weight processing of the inter picture processing of the current picture according to the logic state of the flag comprises:
      skipping at least a portion of the inter picture processing of the slice of the current picture including the at least a portion of the predicted weight processing according to the flag and a determination that the slice is a P-type slice or a B-type slice, and
   wherein the skipped at least a portion of the inter picture processing comprises:

B-slice motion vector difference signaling;
entropy coding method signaling processing;
collocated reference picture signaling;
weighted prediction signaling processing; and
integer motion vector signaling processing.

2. The method of claim 1, wherein determining if the slice of the current picture excludes any predictive coding reference to another picture comprises:
determining if the current picture is an intra random access (IRAP) picture;
determining if the current picture is permitted to be a reference picture for itself; and
when the current picture is an IRAP picture and the current picture is permitted to be a reference picture of itself, determining that the slice of the current picture excludes reference to another picture.

3. The method of claim 2, wherein:
the current picture is determined to be an IRAP picture according to a network abstraction layer (NAL) unit value in a range associated with a broken link access (BLA) picture, an instantaneous decoder refresh (IDR) picture, and a clean random access (CRA) picture.

4. The method of claim 3 wherein the current picture is permitted to be its reference picture according to a second flag in a parameter set associated with the picture.

5. The method of claim 1, wherein the skipped at least a portion of the inter picture processing includes:
reference picture index signaling;
reference picture list modification signaling;
B-slice motion vector difference signaling;
entropy coding method signaling processing;
collocated reference picture signaling;
weighted prediction signaling processing;
motion vector maximum candidate signaling processing; and
integer motion vector signaling processing.

* * * * *